United States Patent
Matsumura et al.

(10) Patent No.: US 12,408,179 B2
(45) Date of Patent: Sep. 2, 2025

(54) TERMINAL, RADIO COMMUNICATION METHOD, BASE STATION, AND SYSTEM FOR CONFIGURING UPLINK OR DOWNLINK CHANNEL BASED ON CODEPOINT OF DOWNLINK CONTROL INFORMATION FIELD

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 354 days.

(21) Appl. No.: 17/906,009

(22) PCT Filed: Mar. 27, 2020

(86) PCT No.: PCT/JP2020/014292
§ 371 (c)(1),
(2) Date: Sep. 9, 2022

(87) PCT Pub. No.: WO2021/192298
PCT Pub. Date: Sep. 30, 2021

(65) Prior Publication Data
US 2023/0114662 A1  Apr. 13, 2023

(51) Int. Cl.
*H04W 72/23* (2023.01)
*H04L 5/00* (2006.01)
*H04W 72/044* (2023.01)

(52) U.S. Cl.
CPC ........... *H04W 72/23* (2023.01); *H04L 5/0094* (2013.01); *H04W 72/046* (2013.01)

(58) Field of Classification Search
CPC .... H04W 72/23; H04W 72/046; H04L 5/0094
See application file for complete search history.

(56) References Cited

U.S. PATENT DOCUMENTS 10,952,231 B2 * 3/2021 Liou .................. H04W 76/27
12,107,795 B2 * 10/2024 Zhang ................ H04L 5/0094
(Continued)

FOREIGN PATENT DOCUMENTS

EP   3567783 A1   11/2019
EP   4024937 A1   7/2022
(Continued)

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
(Continued)

*Primary Examiner* — Chandrahas B Patel
(74) *Attorney, Agent, or Firm* — Osha Bergman Watanabe & Burton LLP

(57) ABSTRACT

A terminal according to one aspect of the present disclosure includes a receiving section that receives downlink control information and a downlink shared channel scheduled by the downlink control information on a cell different from a cell for the downlink control information, and a control section that determines, on the basis of at least one of a TCI state (Transmission Configuration Indication state) list or spatial relation list configured for each cell and information notified by the downlink control information, a spatial relation or TCI state applied to an uplink channel corresponding to the downlink control information.

4 Claims, 15 Drawing Sheets

(56) References Cited

U.S. PATENT DOCUMENTS

| | | |
|---|---|---|
| 2019/0058517 A1 | 2/2019 | Kang et al. |
| 2019/0349964 A1 | 11/2019 | Liou |
| 2022/0109541 A1 | 4/2022 | Cirik et al. |
| 2022/0295304 A1 | 9/2022 | Matsumura et al. |

FOREIGN PATENT DOCUMENTS

| | | |
|---|---|---|
| WO | 2020053941 A1 | 3/2020 |
| WO | 2021011442 A1 | 1/2021 |

OTHER PUBLICATIONS

International Search Report issued in International Application No. PCT/JP2020/014292, mailed Oct. 27, 2020 (5 pages).

Written Opinion issued in International Application No. PCT/JP2020/014292; Dated Oct. 27, 2020 (3 pages).

3GPP TSG RAN WG1 #98; R1-1909201 "Enhancements on multi-TRP/panel transmission" NTT DOCOMO, INC; Prague, CZ, Aug. 26-30, 2019 (36 pages).

3GPP TSG RAN WG1 Meeting #94bis; R1-1810435 "Enhancements on multi-beam operation" MediaTek Inc.; Chengdu, China, Oct. 8-12, 2018 (8 pages).

Office Action issued in Japanese Application No. 2022-510396; Dated May 14, 2024 (12 pages).

Extended European Search Report issued in European Application No. 20926985.1, mailed Nov. 7, 2023 (11 pages).

Samsung: "Summary of email Discussion for Rel.17 enhancements on MIMO for NR", 3GPP TSG RAN Meeting #86, RP-193186; Sitges, Spain, Dec. 9-12, 2019 (3 pages).

\* cited by examiner

TERMINAL, RADIO COMMUNICATION METHOD, BASE STATION, AND SYSTEM FOR CONFIGURING UPLINK OR DOWNLINK CHANNEL BASED ON CODEPOINT OF DOWNLINK CONTROL INFORMATION FIELD

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

In existing LTE systems (for example, 3GPP Rel. 8 to Rel. 14), a user terminal (User Equipment (UE)) transmits uplink control information (UCI) by using at least one of a UL data channel (for example, a Physical Uplink Shared Channel (PUSCH)) and a UL control channel (for example, a Physical Uplink Control Channel (PUCCH)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, NR), it is assumed that a dynamically switched UL beam used for UL transmission by a UE is applied. For example, it is conceivable that a network (for example, a base station) dynamically (for example, at a DCI level) indicates, for the UE, information related to a UL beam used for transmission of an uplink channel (for example, a PUCCH/PUSCH) corresponding to downlink control information (DCI). The information related to the UL beam may be spatial relation information or a TCI state (Transmission Configuration Indication state).

However, how to dynamically notify the UE of information related to a UL beam used for transmission of a UL channel has not been fully studied. Unless an operation for notification of the UL beam or switching of the UL beam is performed appropriately, communication quality may deteriorate.

Thus, an object of the present disclosure is to provide a terminal, a radio communication method, and a base station that suppress deterioration of communication quality even when performing communication by switching a beam.

Solution to Problem

A terminal according to one aspect of the present disclosure includes a receiving section that receives downlink control information and a downlink shared channel scheduled by the downlink control information on a cell different from a cell for the downlink control information, and a control section that determines, on the basis of at least one of a TCI state (Transmission Configuration Indication state) list or spatial relation list configured for each cell and information notified by the downlink control information, a spatial relation or TCI state applied to an uplink channel corresponding to the downlink control information.

Advantageous Effects of Invention

According to one aspect of the present disclosure, it is possible to suppress deterioration of communication quality even when performing communication by switching a beam.

Figure 1:
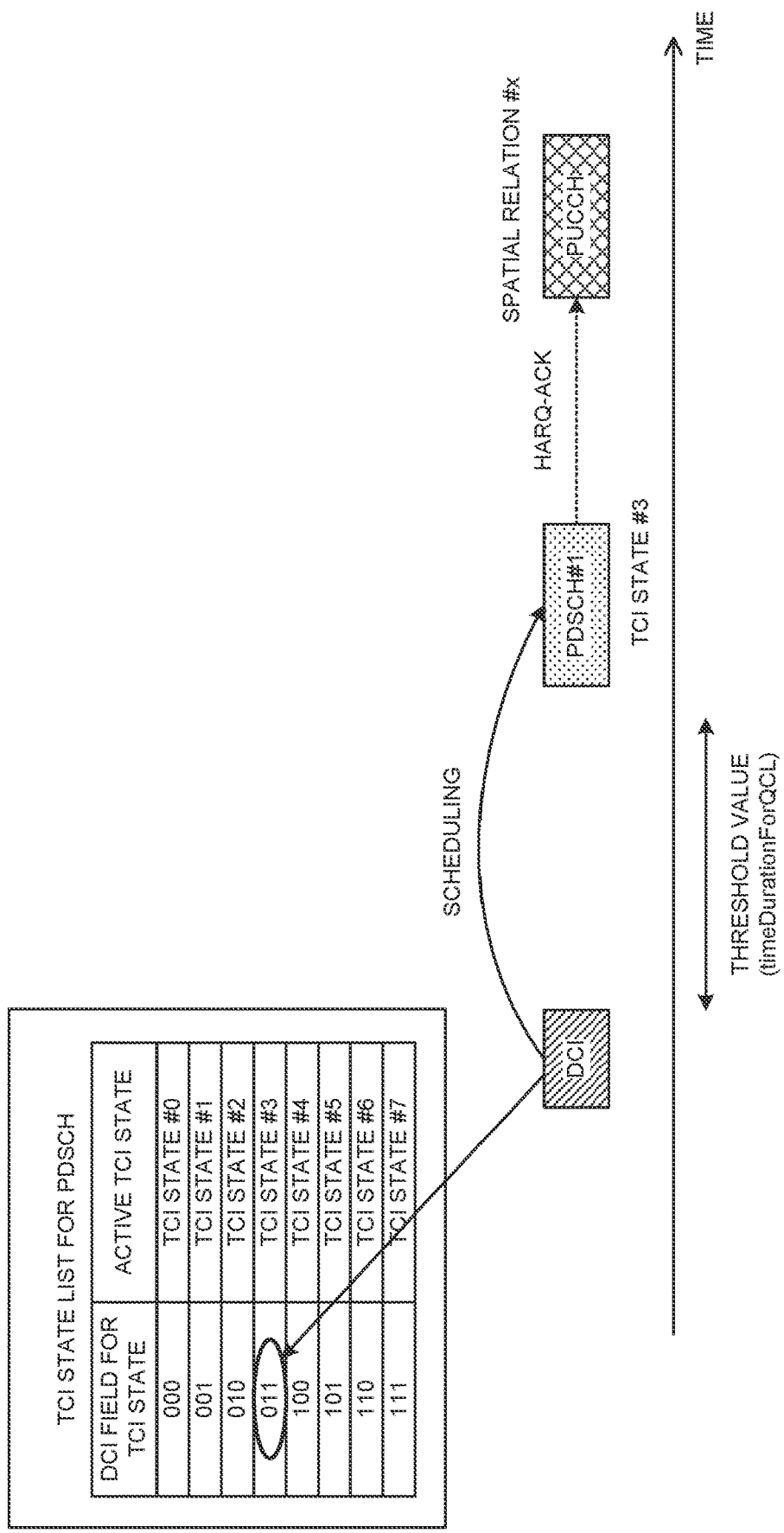
FIG. 1 is a diagram to describe challenges of a method for determining a spatial relation/TCI state for a UL channel.

DESCRIPTION OF EMBODIMENTS (TCI, Spatial Relation, QCL)

For NR, control of reception processing (for example, at least one of reception, demapping, demodulation, and decoding) and transmission processing (for example, at least one of transmission, mapping, precoding, modulation, and coding) of at least one of a signal and a channel (expressed hereinafter as a signal/channel) in a UE based on a transmission configuration indication state (TCI state) is under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal. The TCI state, QCL, and QCL assumption may be interchangeably interpreted.

Note that in the present disclosure, a DL TCI state, a UL spatial relation, a UL TCI state, and the like may be interchangeably interpreted.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A (QCL-A): Doppler shift, Doppler spread, average delay, and delay spread,
QCL type B (QCL-B): Doppler shift and Doppler spread,
QCL type C (QCL-C): Doppler shift and Average delay, and
QCL type D (QCL-D): Spatial reception parameter.

A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

In the present disclosure, the higher layer signaling may be, for example, any one or combination of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

A channel for which the TCI state or spatial relation is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An information element of the TCI state ("TCI-state IE" of RRC) configured using higher layer signaling may include one or a plurality of pieces of QCL information (one or a plurality of QCL information, "QCL-Info"). The QCL information may include at least one of information related to the RS to have a QCL relationship (RS relation information) and information indicating a QCL type (QCL type information). The RS relation information may include information such as an index of the RS (for example, an SSB index, or a non-zero power CSI-RS (NZP CSI-RS) resource ID (Identifier)), an index of a cell in which the RS is located, and an index of a Bandwidth Part (BWP) in which the RS is located.

In Rel-15 NR, as the TCI state for at least one of the PDCCH and PDSCH, both an RS of QCL type A and an RS of QCL type D or only the RS of QCL type A can be configured for the UE.

When the TRS is configured as the RS of QCL type A, it is assumed that the TRS is different from a demodulation reference signal (DMRS) for the PDCCH or PDSCH and the same TRS is periodically transmitted for a long time. The UE can calculate average delay, delay spread, and the like by measuring the TRS.

The UE for which the TRS has been configured as the RS of QCL type A with respect to a TCI state for the DMRS for the PDCCH or PDSCH can assume that the DMRS for the PDCCH or PDSCH and parameters of QCL type A (average delay, delay spread, and the like) for the TRS are the same, and thus can obtain parameters of type A (average delay, delay spread, and the like) for the DMRS for the PDCCH or PDSCH on the basis of a measurement result of the TRS. When performing a channel estimation of at least one of the PDCCH and PDSCH, the UE can perform the channel estimation with higher accuracy by using the measurement result of the TRS.

The UE for which the RS of QCL type D has been configured can determine a UE receive beam (spatial domain reception filter or UE spatial domain reception filter) by using the RS of QCL type D.

An RS of QCL type X in a TCI state may mean an RS being in a QCL type X relationship with (the DMRS of) a certain channel/signal, and this RS may be referred to as a QCL source of QCL type X in the TCI state.

(TCI State for PDSCH)

Information related to QCL between a PDSCH (or a DMRS antenna port related to the PDSCH) and a certain DL-RS may be referred to as a TCI state for the PDSCH and so on.

M (M≥1) TCI states for the PDSCH (M pieces of QCL information (M QCL information) for the PDSCH) may be notified (configured) to the UE by higher layer signaling. Note that the number M of TCI states configured for the UE may be limited by at least one of a UE capability and a QCL type.

DCI used for scheduling of the PDSCH may include a field (which may be referred to as, for example, a TCI field, a TCI state field, and so on) indicating a TCI state for the PDSCH, The DCI may be used for scheduling of a PDSCH in one cell, and may be referred to as, for example, DL DCI, DL assignment, DCI format 1_0, DCI format 1_1, and so on.

Whether the TCI field is included in the DCI may be controlled by information notified to the UE from a base station. The information may be information (for example, TCI presence information, information of TCI presence in DCI, or a higher layer parameter TCI-PresentInDCI) indicating whether the TCI field is present or absent in the DCI. For example, the information may be configured for the UE by higher layer signaling.

When more than 8 kinds of TCI states are configured for the UE, 8 or less kinds of TCI states may be activated (or designated) with use of a MAC CE. The MAC CE may be referred to as a TCI state activation/deactivation MAC CE for a UE-specific PDSCH (TCI States Activation/Deactivation for UE-specific PDSCH MAC CE). A value of the TCI field in the DCI may indicate one of the TCI states activated by the MAC CE.

For application of the TCI state for the PDSCH, a plurality of cases are under study as follows.

<Case 0>

When tci-PresentInDCI is enabled by RRC, a 3-bit DCI field (TCI field) may exist in a certain DCI format (DL assignment), and the DCI field may indicate any (one) of TCI states out of up to 8 active TCI states for the PDSCH. The certain DCI format may be, for example, DCI format 1_1.

<Case 1>

When tci-PresentInDCI is not enabled by the RRC, the 3-bit DCI field (TCI field) does not exist in DCI format 1_1 (DL assignment), and the DCI field fails to indicate any (one) of TCI states out of up to 8 active TCI states for the PDSCH. In this case, the UE applies a default TCI state to the PDSCH.

For example, when tci-PresentInDCI is not enabled (the PDSCH is scheduled by a DCI format without presence of TCI state fields) and a scheduling offset is equal to or greater than a threshold value (timeDurationForQCL), the UE may assume that the default TCI state is a TCI state for a scheduling CORESET (used CORESET) (identical to the TCI state), and may apply the TCI state to the PDSCH.

In the present disclosure, the scheduling offset is duration (time offset) between reception of DL DCI (PDCCH) and reception of a corresponding PDSCH. The threshold value (timeDurationForQCL) compared with the scheduling offset may be based on a UE capability reported for determination of PDSCH antenna port QCL.

<Case 2>

When the scheduling offset is less than the threshold value regardless of whether tci-PresentInDCI is enabled, a TCI state designated by the DCI for the UE is not applied to reception of a corresponding PDSCH (inapplicable). In other words, the UE does not perform switching of (fails to switch) the TCI state for the PDSCH based on the DCI. In this case, the UE applies a default TCI state. The default TCI state may be a TCI state corresponding to the lowest CORESET ID in the latest monitored slot.

For example, when all TCI code points are mapped to a single TCI state independent from configurations of tci-PresentInDCI and tci-PresentInDCI-ForFormat1_2 in an RRC connected mode and the scheduling offset is less than the threshold value, the UE assumes that a DM-RS port for the PDSCH in a serving cell is QCL with an RS related to a QCL parameter used for QCL indication of a PDCCH of a specific CORESET. The specific CORESET is, in one or more CORESETs monitored by the UE in an active BWP of the serving cell, related to a monitored search space having the lowest controlResourceSetId in the latest slot. Note that in the present disclosure, the condition "in the latest slot (in the latest monitored slot)" may be omitted.

<Case 3>

When using cross-carrier scheduling, the UE applies a default TCI state different from a default TCI state in a case where non-cross-carrier scheduling is used (for example, case 1 and case 2). When a PDCCH and a PDSCH exist in the same CC, the UE does not predict that the scheduling offset is less than the threshold value. When the PDCCH and the PDSCH exist in different CCs, the UE applies a TCI state with the lowest TCI state ID in an active BWP of a scheduled CC.

For example, when a CORESET associated with a search space set for cross-carrier scheduling is configured for the UE and a PDCCH to transmit DCI and a PDSCH scheduled by the DCI are transmitted by the same carrier, the UE assumes that tci-PresentInDCI is enabled or tci-PresentInDCI-ForFormat1_2 is configured for the CORESET. When "QCL-Type D" is included in one or more TCI states configured for a serving cell scheduled by the search space set, the UE predicts that a time offset (scheduling offset) between reception of a PDCCH detected by the search space set and reception of a corresponding PDSCH is equal to or greater than the threshold value (timeDurationForQCL).

When a PDCCH to transmit scheduling DCI is received by one component carrier and a PDSCH scheduled by the DCI is received by another component carrier, the following (1) and (2) may be employed.

(1) The threshold value is determined on the basis of subcarrier spacing ($\mu$PDSCH) of the scheduled PDSCH.

When µPDCCH (subcarrier spacing of the PDCCH) <µPDSCH, additional timing delay d is added to the threshold value.

(2) In both a case where tci-PresentInDCI is configured to "enabled" and an offset between reception of DL DCI and a corresponding PDSCH is less than the threshold value and a case where tci-PresentInDCI is not configured, the UE obtains QCL assumption (TCI state) for the scheduled PDSCH from an active TCI state having the lowest ID applicable to a PDSCH in an active BWP for a scheduled cell.

(Spatial Relation for PUCCH)

A parameter (PUCCH configuration information or PUCCH-Config) used for PUCCH transmission may be configured for the UE by higher layer signaling (for example, Radio Resource Control (RRC) signaling). The PUCCH configuration information may be configured for each partial band (for example, uplink bandwidth part (BWP)) in a carrier (also referred to as a cell or a component carrier (CC)).

The PUCCH configuration information may include a list of PUCCH resource set information (for example, PUCCH-ResourceSet) and a list of PUCCH spatial relation information (for example, PUCCH-SpatialRelationInfo).

The PUCCH resource set information may include a list (for example, resourceList) of PUCCH resource indices (IDs, for example, PUCCH-ResourceId).

When the UE has no dedicated PUCCH resource configuration information (for example, dedicated PUCCH resource configuration) provided by PUCCH resource set information in the PUCCH configuration information (before RRC setup), the UE may determine a PUCCH resource set on the basis of a parameter (for example, pucch-ResourceCommon) in system information (for example, System Information Block Type1 (SIB1) or Remaining Minimum System Information (RMSI)). The PUCCH resource set may include 16 PUCCH resources.

On the other hand, when the UE has the above-described dedicated PUCCH resource configuration information (UE-dedicated uplink control channel configuration or dedicated PUCCH resource configuration) (after RRC set up), the UE may determine the PUCCH resource set in accordance with the number of UCI information bits.

The UE may determine one PUCCH resource (index) in the above-described PUCCH resource set (for example, a PUCCH resource set determined in a cell-specific manner or UE-dedicated manner) on the basis of at least one of a value of a field (for example, a PUCCH resource indication (PUCCH resource indicator) field) in downlink control information (DCI) (for example, DCI format 1_0 or 1_1 used for scheduling of a PDSCH), the number of CCEs (NccE) in a control resource set (Control REsource SET (CORESET)) for reception of a PDCCH to deliver the DCI, and the leading (first) CCE index ($n_{CCE,0}$) for the PDCCH reception.

The PUCCH spatial relation information (for example, "PUCCH-spatialRelationInfo" of an RRC information element) may indicate a plurality of candidate beams (spatial domain filters) for PUCCH transmission. The PUCCH spatial relation information may indicate a spatial relation between an RS (Reference signal) and the PUCCH.

The list of the PUCCH spatial relation information may include some elements (PUCCH spatial relation information IEs (Information Elements)). Each piece of the PUCCH spatial relation information may include, for example, at least one of a PUCCH spatial relation information index (ID, for example, pucch-SpatialRelationInfoId), a serving cell index (ID, for example, servingCellId), and information related to an RS (reference RS) being in a spatial relation with the PUCCH.

For example, the information related to the RS may be an SSB index, a CSI-RS index (for example, an NZP-CSI-RS resource configuration ID), or an SRS resource ID and BWP ID. The SSB index, the CSI-RS index, and the SRS resource ID may be associated with at least one of a beam, a resource, and a port selected depending on measurement of a corresponding RS.

When more than one piece of spatial relation information related to the PUCCH are configured, the UE may control, on the basis of a PUCCH spatial relation activation/deactivation MAC CE, so that one piece of PUCCH spatial relation information is active for one PUCCH resource in a certain time.

A PUCCH spatial relation activation/deactivation MAC CE of Rel-15 NR is expressed by a total of 3 octets (8 bits×3=24 bits) of octets (Octs) 1 to 3.

The MAC CE may include information about a serving cell ID ("Serving Cell ID" field), a BWP ID ("BWP ID" field), a PUCCH resource ID ("PUCCH Resource ID" field), and the like as application targets.

The MAC CE includes "$S_i$" (i=0 to 7) fields. The UE activates spatial relation information with spatial relation information ID #i when a certain Si field indicates 1. The UE deactivates the spatial relation information with spatial relation information ID #i when the certain $S_i$ field indicates 0.

After 3 ms from transmitting a positive acknowledgment (ACK) to a MAC CE to activate PUCCH spatial relation information, the UE may activate PUCCH relation information specified by the MAC CE.

(Example of Application of TCI State)

FIG. 1 is a diagram to show an example of TCI control by the DCI. In the example of FIG. 1, it is assumed that tci-PresentInDCI is enabled and the scheduling offset is equal to or greater than a threshold value. In this case, control of the TCI state by the DCI (at a DCI level) is possible.

In FIG. 1, tci-PresentInDCI is enabled, and thus active TCI states are configured in DCI fields. As shown in a TCI state list, it is assumed that "011" corresponding to "TCI state #3" is configured/indicated in a DCI field indicating the TCI state. In this case, the UE applies "TCI state #3" to PDSCH #1 scheduled by the DCI.

Thus, when a certain condition is satisfied, the UE may determine, on the basis of fields (for example, TCI state fields) included in DCI, a TCI state applied to reception of a PDSCH scheduled by the DCI. Therefore, the UE can dynamically switch a DL beam at the DCI level.

On the other hand, in existing systems (for example, Rel. 15 and Rel. 16), a UL beam used for transmission of an uplink control channel (PUCCH) is notified to the UE from the base station with use of RRC signaling/MAC CE. The UL beam may be interpreted as a spatial relation or a UL TCI state.

For example, in the existing systems, a plurality of spatial relations are configured by the RRC signaling for each PUCCH resource or for each PUCCH group, and one spatial relation is selected by the MAC CE. Each spatial relation may correspond to a synchronization signal block (SSB) index. In other words, in the existing systems, a structure to dynamically switch, at the DCI level, the UL beam used for PUCCH transmission is not supported.

In the existing systems, a structure to flexibly switch, at the DCI level, the UL beam used for transmission of an uplink shared channel (PUSCH), similarly to that for the PDSCH is not supported. For example, when the PUSCH is scheduled by DCI format 0_0, a spatial relation applied to the PUSCH is determined on the basis of a spatial relation configured for the lowest PUCCH in an active UL BWP.

When the PUSCH is scheduled by DCI format 0_1, specification using 1 or 2 bits of an SRI field included in the DCI is supported for the spatial relation applied to the PUSCH. However, a structure to flexibly switch the beam, as compared to that for the PDSCH, is not supported.

Thus, in the existing systems, flexible switching of a beam used for reception of a downlink channel (for example, a PDSCH) at the DCI level is supported, but flexible switching of a UL beam used for transmission of an uplink channel (for example, a PUCCH/PUSCH) at the DCI level is not supported.

For example, in FIG. 1, assume a case where uplink control information (for example, HARQ-ACK) for the PDSCH scheduled by the DCI is transmitted with use of the PUCCH. In this case, a TCI state used for the PDSCH can be flexibly switched at the DCI level, as mentioned above. On the other hand, a spatial relation (or TCI state) used for the PUCCH is determined on the basis of indication by the MAC CE or a default spatial relation. The default spatial relation may be determined on the basis of a TCI state corresponding to a control resource set (CORESET) used for transmission of the DCI.

Thus, in the existing systems, when HARQ-ACK corresponding to the PDSCH is transmitted with the uplink channel (PUCCH/PUSCH), a method for aligning a DL beam for the PDSCH and a UL beam corresponding to the uplink channel is not supported.

The inventors of the present invention studied a method for flexibly switching, at the DCI level, a UL beam (for example, a spatial relation/TCI state) applied to transmission of a UL channel similarly to a DL beam applied to transmission of a DL channel (for example, a PDSCH), and came up with the idea of the present embodiment.

Embodiments according to the present disclosure will be described in detail with reference to the drawings as follows. Radio communication methods and respective aspects according to respective embodiments may each be employed individually, or may be employed in combination. Note that in the present disclosure, "A/B" may be interpreted as "at least one of A and B." Note that "notification," "indication," "configuration," and "transmission" of the present disclosure may be interchangeably interpreted.

In description below, the spatial relation may be referred to as spatial relation information. "The spatial relation is determined on the basis of TCI state #X" may be interpreted as "the spatial relation is the same as a reference signal of Type D configured in TCI state #X."

(First Aspect)

In a first aspect, a case where a spatial relation applied to a UL channel (for example, a PUCCH/PUSCH) is determined on the basis of a TCI state applied to a DL channel (for example, a PDSCH) will be described. Note that the spatial relation may be interpreted as a TCI state or a UL TCI state.

Figure 2:
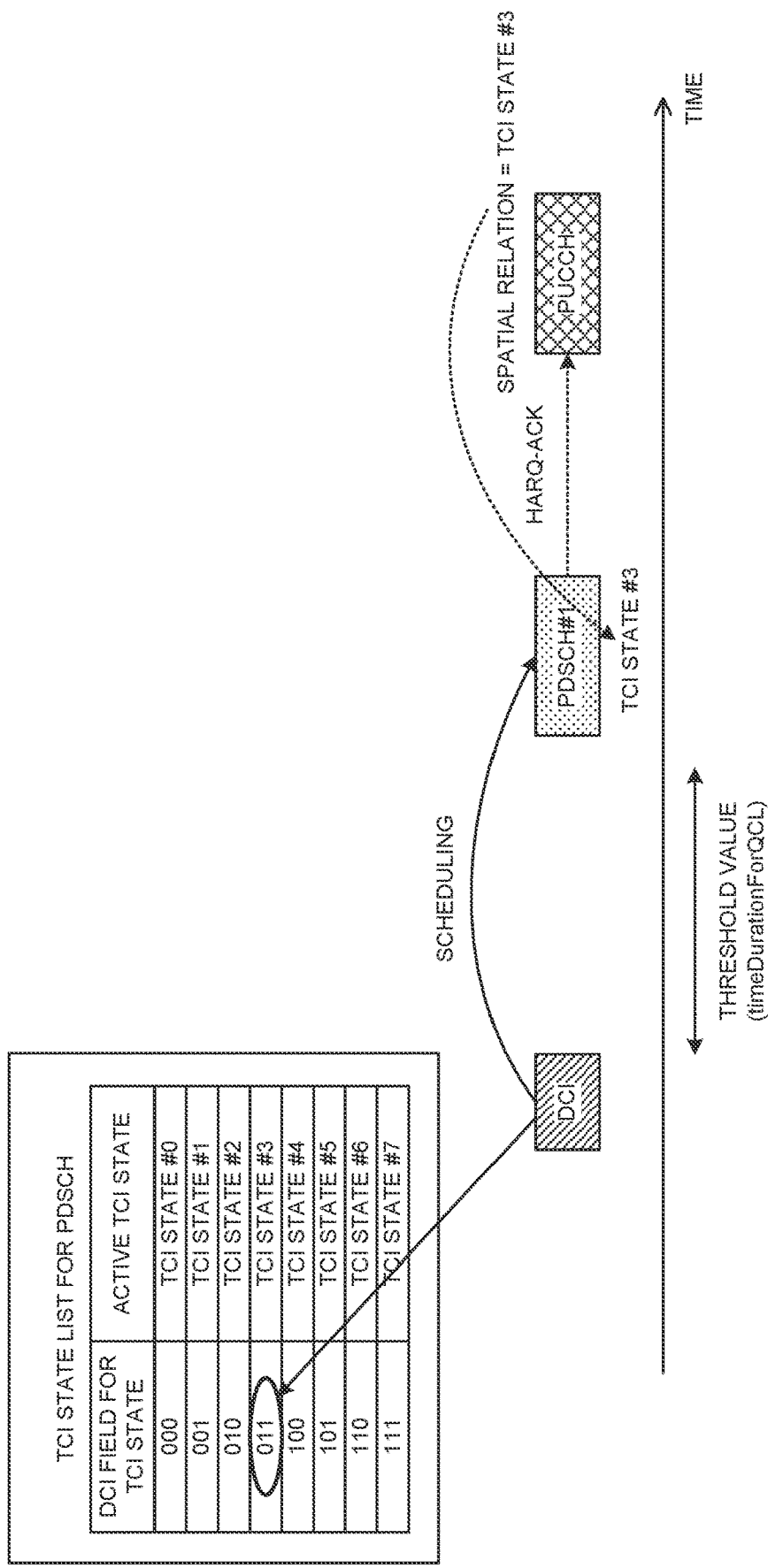
FIG. 2 is a diagram to show an example of a method for determining a spatial relation/TCI state for a UL channel.

FIG. 2 shows an example of a case where a spatial relation used for transmission of a UL channel used for transmission of uplink control information (UCI) corresponding to PDSCH #1 is determined on the basis of a TCI state used for reception of PDSCH #1. The uplink channel may be referred to as a UL channel corresponding to DCI or a UL channel corresponding to a PDSCH.

Here, a case is shown in which a scheduling offset (for example, an offset between the DCI and PDSCH #1) of PDSCH #1 scheduled by the DCI is equal to or greater than a threshold value and a field for notification of the TCI state (also referred to as a TCI state field) is included in the DCI. A UE may judge the TCI state (here, TCI state #3) used for reception of PDSCH #1 on the basis of the TCI state field included in the DCI to schedule PDSCH #1.

FIG. 2 shows a case where UCI (for example, HARQ-ACK) corresponding to PDSCH #1 is transmitted on a PUCCH. A timing of transmission of the PUCCH and a PUCCH resource may be indicated by the DCI to schedule PDSCH #1. The UE may determine a timing of transmission of the UL channel or the like on the basis of the DCI.

The UE may judge, on the basis of at least one of option 1-1 to option 1-2 below, a spatial relation/TCI state applied to the UL channel.

<Option 1-1>

The UE may determine, on the basis of a TCI state applied to a corresponding PDSCH, the spatial relation/TCI state applied to the UL channel (see FIG. 2). For example, the UE applies the TCI state (here, TCI state #3) applied to PDSCH #1 to transmission of the UL channel (here, the PUCCH).

Alternatively, the UE may apply a spatial relation/UL TCI state associated with TCI state #3 to the UL channel transmission. An association between a DL TCI state and the spatial relation/UL TCI state may be defined by specifications, or may be notified to the UE from a base station with use of higher layer signaling or the like.

Thus, the spatial relation/TCI state for the UL channel is determined on the basis of the TCI state for the PDSCH, thereby allowing the spatial relation/TCI state for the UL channel as well to be controlled dynamically and flexibly. The TCI state for the PDSCH is applied to the UL channel, thereby eliminating notification of spatial relation information to the UL channel, and thus it is possible to reduce overhead.

Option 1-1 may be preferably employed in a case where a DL beam and a UL beam comprises/supports correspondence (beam correspondence).

<Option 1-2>

The UE may determine, on the basis of information included in DCI corresponding to the UL channel (or DCI to schedule a PDSCH corresponding to the UL channel), the spatial relation/TCI state applied to the UL channel. For example, the spatial relation/TCI state for the UL channel may be determined on the basis of a certain field included in the DCI.

Figure 3:
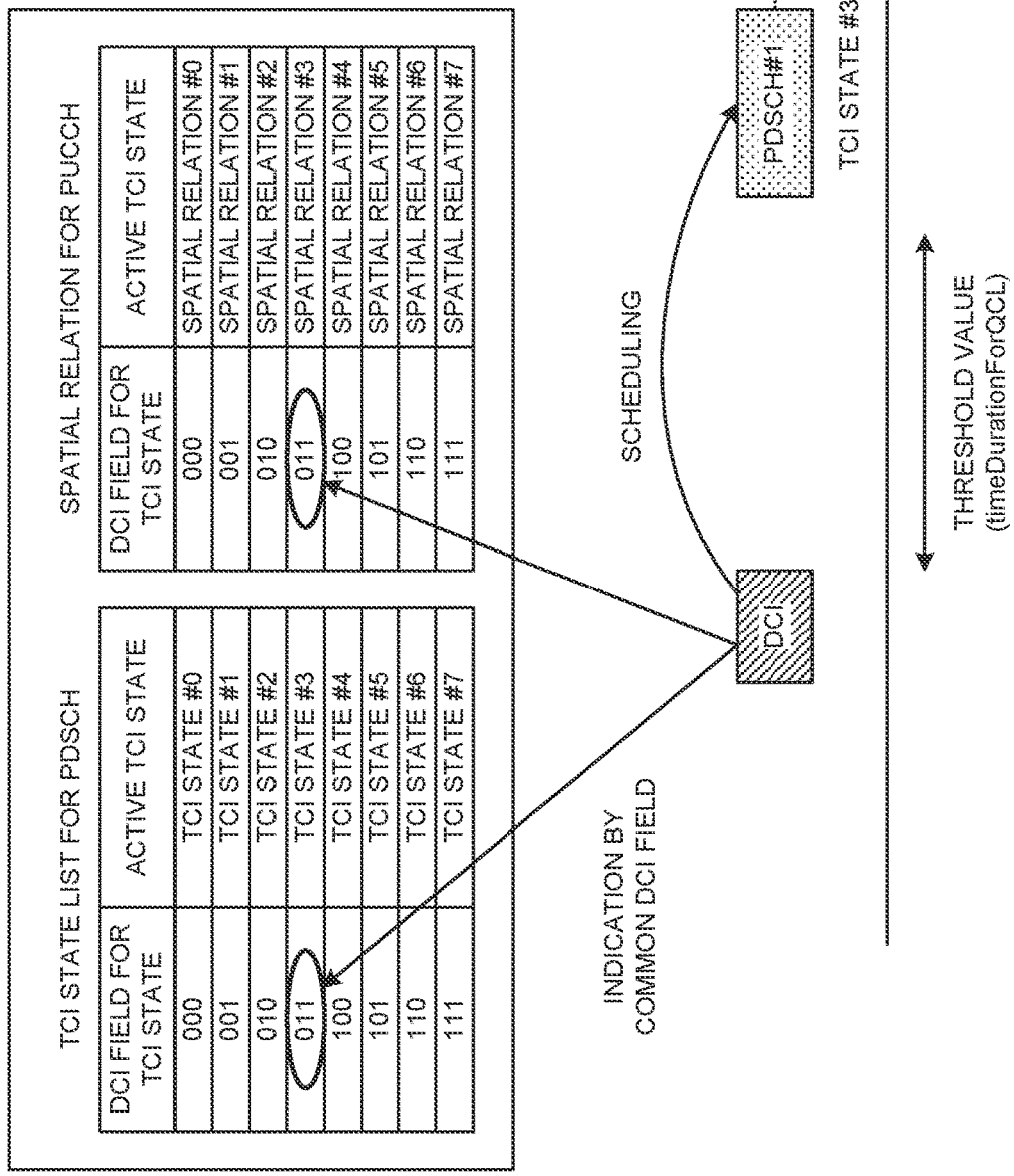
FIG. 3 is a diagram to show another example of the method for determining the spatial relation/TCI state for the UL channel.

The certain field used for notification of the spatial relation/TCI state for the UL channel may be configured in common with a field (for example, a TCI state field) used for notification of a TCI state for the DL channel (for example, the PDSCH) (see FIG. 3). In other words, a common field may be configured for notification of the spatial relation/TCI state for the UL channel and notification of the TCI state for the PDSCH.

Figure 4:
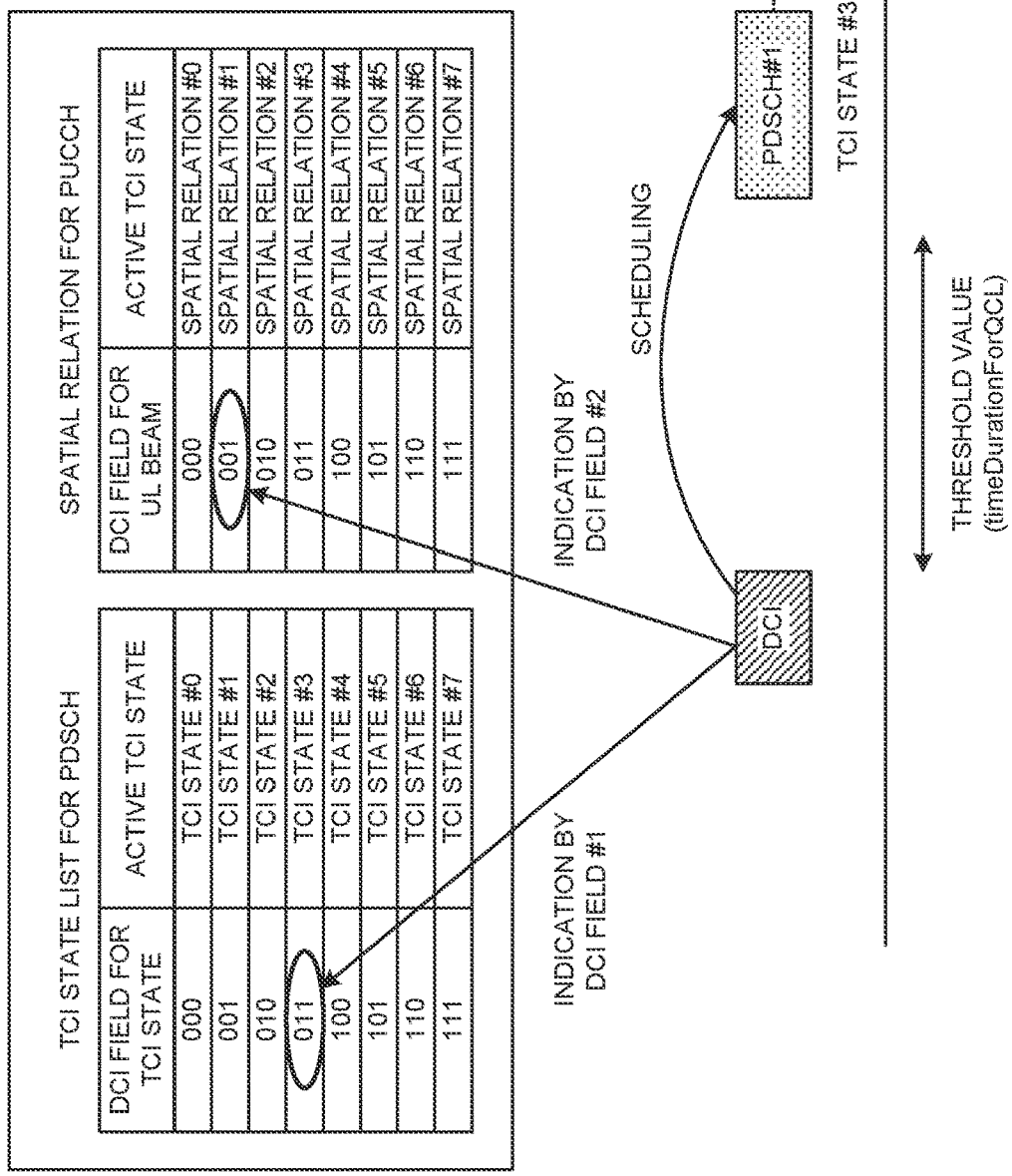
FIG. 4 is a diagram to show another example of the method for determining the spatial relation/TCI state for the UL channel.

Alternatively, the certain field used for notification of the spatial relation/TCI state for the UL channel may be configured separately from the field used for notification of the TCI state for the DL channel (for example, the PDSCH) (see FIG. 4). In other words, a separate field may be configured for performing of notification of the spatial relation/TCI state for the UL channel and notification of the ICI state for the PDSCH.

{Common Field}

A plurality of TCI states may be configured for the PDSCH, and a plurality of spatial relations/UL TCI states may be configured for each UL channel (see FIG. 3). Here, a case is shown in which correspondence between a plurality of TCI states for the PDSCH and code points of a TCI state field included in the DCI is configured. A case is shown in which correspondence between a plurality of spatial relations for the UL channel (here, the PUCCH) and code points of a TCI state field included in the DCI is configured.

Both the TCI state for the PDSCH and the spatial relation/TCI state for the UL channel may be notified by a common field (for example, a TCI state field) included in the DCI. Here, a case is shown in which '011' is notified by the common field.

The UE judges the TCI state for the PDSCH and the spatial relation/TCI state for the UL channel on the basis of bit information (for example, code points) of the common field. Here, a case is shown in which the UE applies TCI state #3 (corresponding to '011') to PDSCH #1 and applies spatial relation #3 (corresponding to '011') to the UL channel.

FIG. 3 shows a case where an index of the TCI state for the PDSCH and an index of the spatial relation for the UL channel are the same for an identical code point of the common field, but the present disclosure is not limited to this. The index of the TCI state for the PDSCH and the index of the spatial relation for the UL channel may be configured differently from each other for the identical code point of the common field.

Thus, the spatial relation/TCI state for the UL channel is determined on the basis of corresponding DCI, thereby allowing the spatial relation/TCI state for the UL channel as well to be controlled dynamically and flexibly. The TCI state for the PDSCH and the spatial relation/TCI state for the UL channel are notified with use of the common field, thereby allowing an increase in DCI overhead to be suppressed.

Even when the DL beam and the UL beam do not have/support correspondence (beam correspondence) (for example, when the spatial relation corresponds to an SRS resource instead of a DL RS), specification of a common beam for UL and DL is possible.

Note that the UE may perform control so as to employ option 1-1 when a plurality of spatial relations/UL TCI states are not configured for the UL channel.

{Separate Field}

A plurality of TCI states may be configured for the PDSCH, and a plurality of spatial relations/UL TCI states may be configured for each UL channel (see FIG. 4). Here, a case is shown in which correspondence between a plurality of TCI states for the PDSCH and code points of a first field (for example, a TCI state field) included in the DCI is configured. A case is shown in which correspondence between a plurality of spatial relations for the UL channel (here, the PUCCH) and code points of a second field (for example, a UL beam field or a spatial relation field) included in the DCI is configured.

The TCI state for the PDSCH may be notified by the first field (DCI field #1) included in the DCI, and the spatial relation/TCI state for the UL channel may be notified by the second field (DCI field #2). Here, a case is shown in which '011' is notified by the first field and '001' is notified by the second field.

The UE judges each of the TCI state for the PDSCH and the spatial relation/TCI state for the UL channel on the basis of bit information (for example, code points) of the first field and the second field. Here, a case is shown in which the UE applies TCI state #3 (corresponding to '011') to PDSCH #1 and applies spatial relation #1 (corresponding to '001') to the UL channel.

FIG. 4 shows a case where an index of the TCI state for the PDSCH and an index of the spatial relation for the UL channel are the same for an identical code point of the common field, but the present disclosure is not limited to this. The index of the TCI state for the PDSCH and the index of the spatial relation for the UL channel may be configured differently from each other for the identical code point of the common field.

Thus, the spatial relation/TCI state for the UL channel is determined on the basis of corresponding DCI, thereby allowing the spatial relation/TCI state for the UL channel as well to be controlled dynamically and flexibly. The TCI state for the PDSCH and the spatial relation/TCI state for the UL channel are each notified with use of the separate field, thereby allowing the TCI state applied to UL and DL to be configured flexibly.

<Application Condition>

The first aspect may be employed in a case where at least one of application conditions 1 to 5 below is satisfied.

{Application Condition 1}

Application condition 1 may be a case where a TCI state field is configured for the DCI. Whether the TCI state field is configured for the DCI may be configured by higher layer signaling (for example, tci-PresentInDCI) for the UE from the base station. The UE may, when tci-PresentInDCI is configured (for example, when tci-PresentInDCI is set to enable), control so as to employ the above-mentioned option 1-1 or option 1-2.

{Application Condition 2}

Application condition 2 may be a case where a scheduling offset (for example, an offset between the DCI and the PDSCH) is equal to or greater than a certain threshold value (for example, timeDurationForQCL). The certain threshold value may be determined on the basis of a UE capability, or may be configured for the UE from the base station.

{Application Condition 3}

Application condition 3-1 may be a case where a spatial relation is not configured for each PUCCH resource. The PUCCH resource may be interpreted as an SRS resource corresponding to an SRI for the PUSCH. In other words, application condition 3-1 may be the same as a condition for configuration of a default spatial relation in Rel. 16. When compatibility with Rel. 15/16 is considered, application condition 3-1 may be employed in combination with application condition 4.

Application condition 3-2 may be a case where a spatial relation for the PUCCH resource is configured as a new parameter (for example, a PDSCH), {Application Condition 4}

Application condition 4 may be a case where application of an operation corresponding to the first aspect is configured/notified by RRC/MAC CE. In other words, the operation corresponding to the first aspect may be defined as an operation different from that of Rel. 15 to Rel. 16.

{Application Condition 5}

Application condition 5 may be a case of non-cross-carrier scheduling (or a case where cross-carrier scheduling is not applied). In other words, application condition 5 may be a case where a PDCCH used for transmission of the DCI to schedule the PDSCH and the PDSCH are received on the same CC.

<Variations>

The above-described description mainly describes the PUCCH used for transmission of HARQ-ACK as an example, but the present disclosure is not limited to this. For example, the above-described description may be employed in UL transmission of a UL channel, aperiodic CSI (for example, A-CSI transmitted on a PUCCH/PUSCH), an aperiodic SRS, and the like triggered by DCI.

In the above-described description, the certain field may be interpreted as a TCI state, a PRI, an SRI, TDRA or FDRA.

Alternatively, a spatial relation for the PUCCH used for transmission of anything other than HARQ-ACK, periodic CSI (P-CSI), or semi-persistent CSI (SP-CSI) may be configured in the same manner as that of existing systems (for example, Rel. 15/16).

Alternatively, the spatial relation for the PUCCH used for transmission of anything other than HARQ-ACK, periodic CSI (P-CSI), or semi-persistent CSI (SP-CSI) may be updated so that a common UL beam and DL beam can be configured. For example, a TCI state for the most recently received PDSCH (most recent reception of PDSCH) may be applied to a spatial relation for the PUCCH used for transmission of anything other than HARQ-ACK.

(Second Aspect)

In a second aspect, an example of a spatial relation/TCI state applied to a UL channel (for example, a PUCCH/PUSCH) in a case where cross-carrier scheduling is applied will be described.

Figure 5:
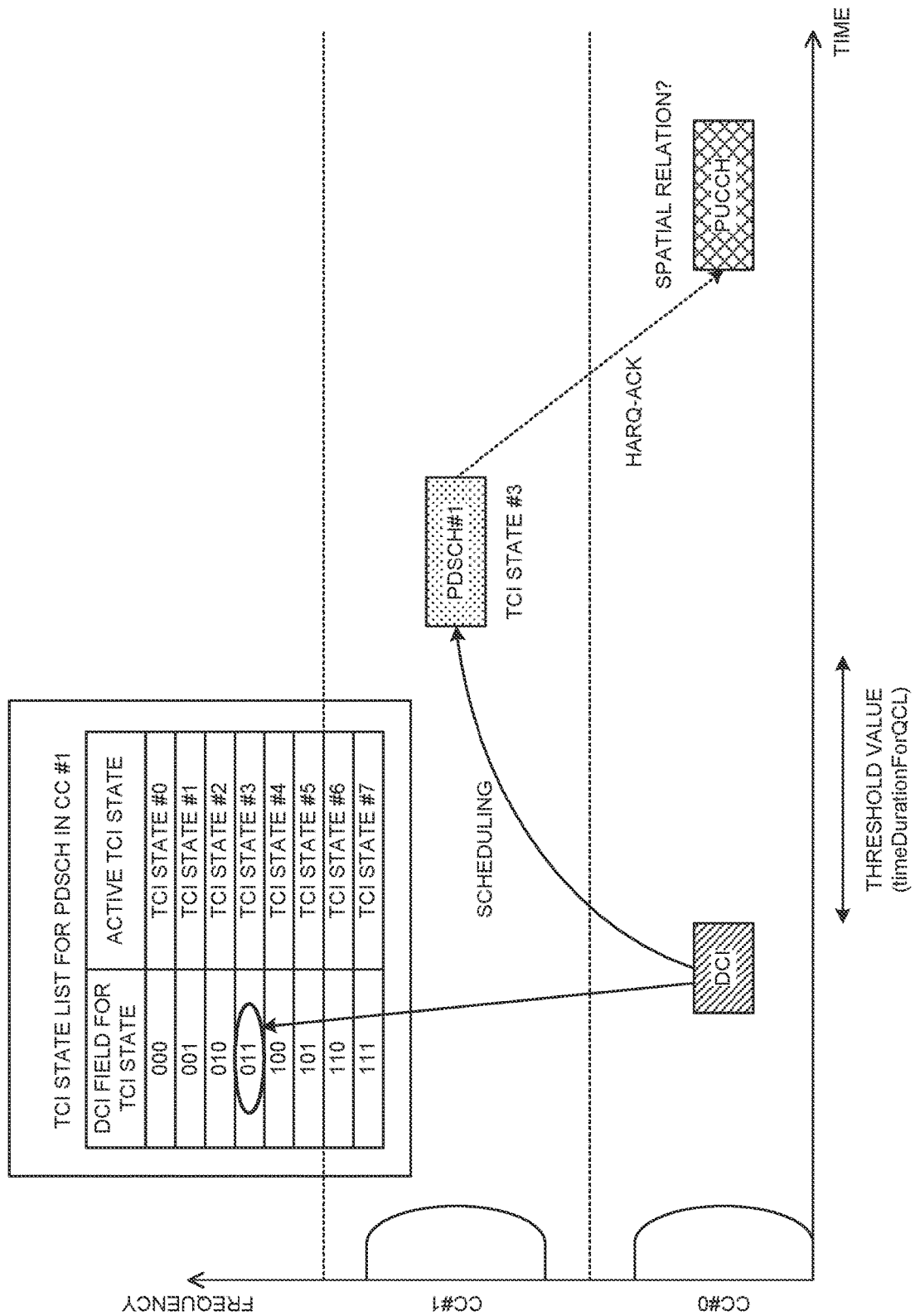
FIG. 5 is a diagram to describe challenges of a method for determining a spatial relation/TCI state for a UL channel in a case where cross-carrier scheduling is applied.

When a certain condition is satisfied in the case where cross-carrier scheduling is applied, a TCI state applied to PDSCH reception can be dynamically switched at a DCI level (see FIG. 5). The certain condition may be, for example, a case where of a PDSCH scheduled by DCI is equal to or greater than a threshold value and a TCI state field is included in the DCI.

FIG. 5 shows a case where PDSCH #1 transmitted on CC #1 is scheduled by DCI (or PDCCH) transmitted on CC #0. In this case, CC #1 and CC #1 may be referred to as a scheduling CC and a scheduled CC, respectively, A UE may control reception of PDSCH #1 transmitted on CC #2 by applying a TCI state (here, TCI state #3) notified by the TCI state field included in the DCI.

On the other hand, when the DCI or UCI (for example, HARQ-ACK) for PDSCH #1 is performed with use of a UL channel (for example, a PUCCH), how to control a spatial relation/TCI state applied to the UL channel is an issue.

FIG. 5 shows a case where HARQ-ACK for PDSCH #1 transmitted on CC #1 is transmitted with use of the PUCCH configured for CC #0. In such a case, how to control when dynamically switching, at the DCI level, a spatial relation/TCI state used for transmission of the PUCCH is an issue.

Thus, in the second aspect, a TCI state list/spatial relation list is configured for each CC (or cell or carrier), and the spatial relation/TCI state applied to the UL channel is determined on the basis of the TCI state list/spatial relation list configured for each CC.

When cross-carrier scheduling is applied, the UE may judge, on the basis of at least one of option 2-1 to option 2-3 below, the spatial relation/TCI state applied to the UL channel.

<Option 2-1>

A TCI state list for a PDSCH may be configured for each CC to determine, on the basis of the TCI state list configured for a CC on which at least one of the UL channel and the DCI is scheduled, a spatial relation/TCI state applied to the UL channel. On the other hand, a TCI state applied to a PDSCH may be determined on the basis of a TCI state list configured for a CC on which the PDSCH is transmitted.

The UE may determine, on the basis of information included in DCI corresponding to the UL channel and a TCI state list corresponding to a CC on which the DCI or UL channel is transmitted, a spatial relation/TCI state applied to the UL channel. For example, the spatial relation/TCI state for the UL channel may be determined on the basis of a certain field included in the DCI.

Figure 6:
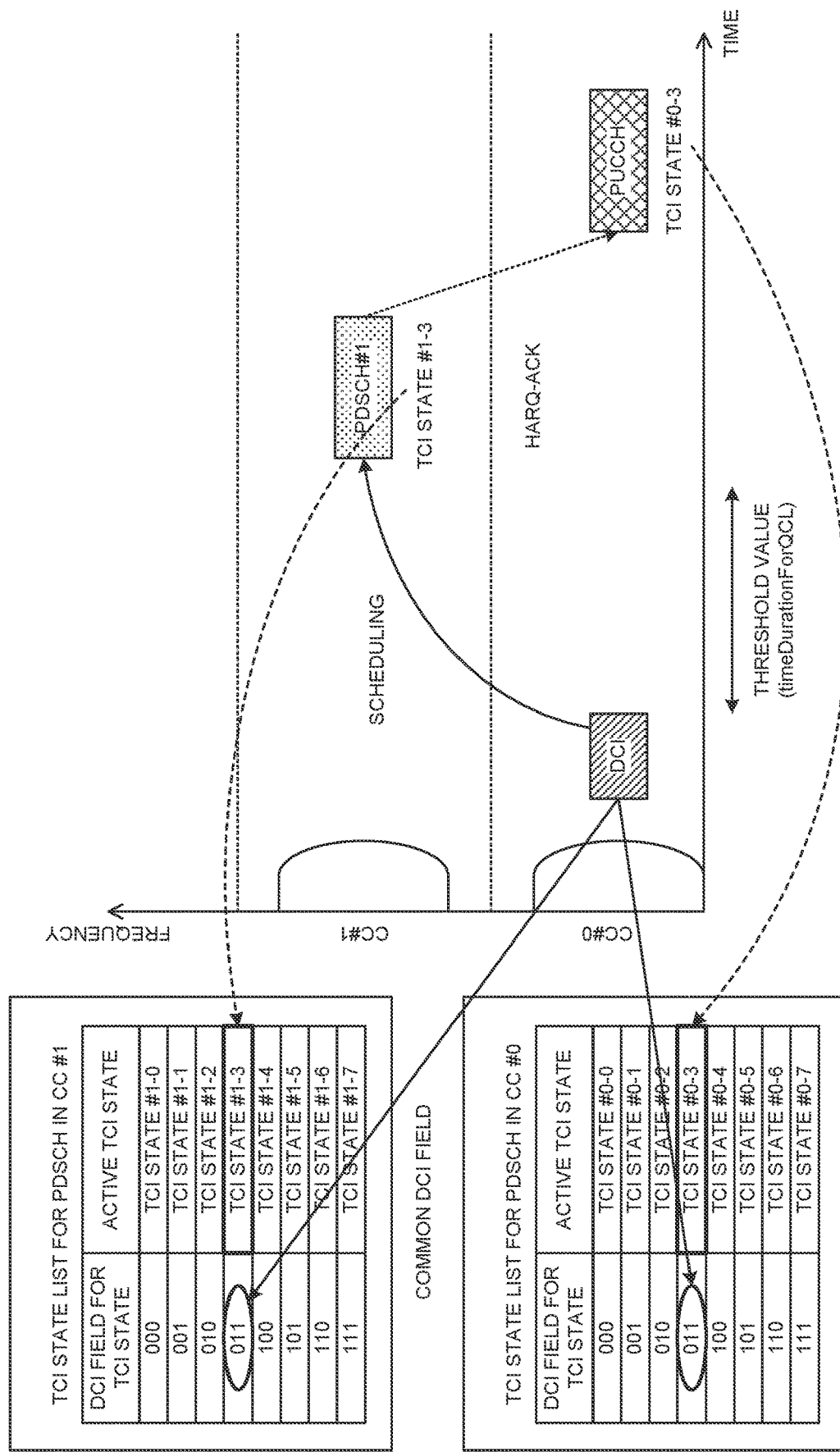
FIG. 6 is a diagram to show an example of a method for determining a spatial relation/TCI state for a UL channel in a case where cross-carrier scheduling is applied.

The certain field used for notification of the spatial relation/TCI state for the UL channel may be configured in common with a field (for example, a TCI state field) used for notification of a TCI state for the DL channel (for example, the PDSCH) (see FIG. 6). In other words, a common field may be configured for notification of the spatial relation/TCI state for the UL channel and notification of the TCI state for the PDSCH.

Alternatively, the certain field used for notification of the spatial relation/TCI state for the UL channel may be configured separately from the field used for notification of the TCI state for the DL channel (for example, the PDSCH) (see FIG. 7), In other words, a separate field may be configured for performing for notification of the spatial relation/TCI state for the UL channel and notification of the TCI state for the PDSCH.

{Common Field}

The UE may receive information related to the TCI state list for the PDSCH configured for each CC by using RRC signaling/MAC CE. FIG. 6 shows a case where a TCI state list for a PDSCH corresponding to CC #0 and a TCI state list for a PDSCH corresponding to CC #1 are configured, FIG. 6 shows a case where correspondence between a plurality of TCI states for the PDSCH and code points of a TCI state field included in the DCI is configured in each TCI state list.

Both the TCI state applied to PDSCH #1 and the spatial relation/TCI state applied to the UL channel may be notified by a common field (for example, a TCI state field) included in the DCI. Here, a case is shown in which '011' is notified by the common field.

The UE judges, on the basis of bit information (for example, code points) of the common field, each of the TCI state applied to the PDSCH transmitted on CC #1 and the spatial relation/TCI state applied to the UL channel transmitted on CC #0. Here, a case is shown in which the UE applies TCI state #1-3 (corresponding to '011' of the TCI state list in CC #1) to PDSCH #1 and applies TCI state #0-3 (corresponding to '011' of the TCI state list in CC #0) to the UL channel.

Thus, the spatial relation/TCI state for the UL channel is determined on the basis of information included in the DCI and a TCI state list corresponding to a CC on which the UL channel or DCI is transmitted. Thus, even when a PDSCH and a corresponding UL channel are transmitted on different CCs, it is possible to dynamically and flexibly control the spatial relation/TCI state for the UL channel as well. The TCI state for the PDSCH and the spatial relation/TCI state for the UL channel are notified with use of the common field, thereby allowing an increase in DCI overhead to be suppressed.

{Separate Field}

Figure 7:
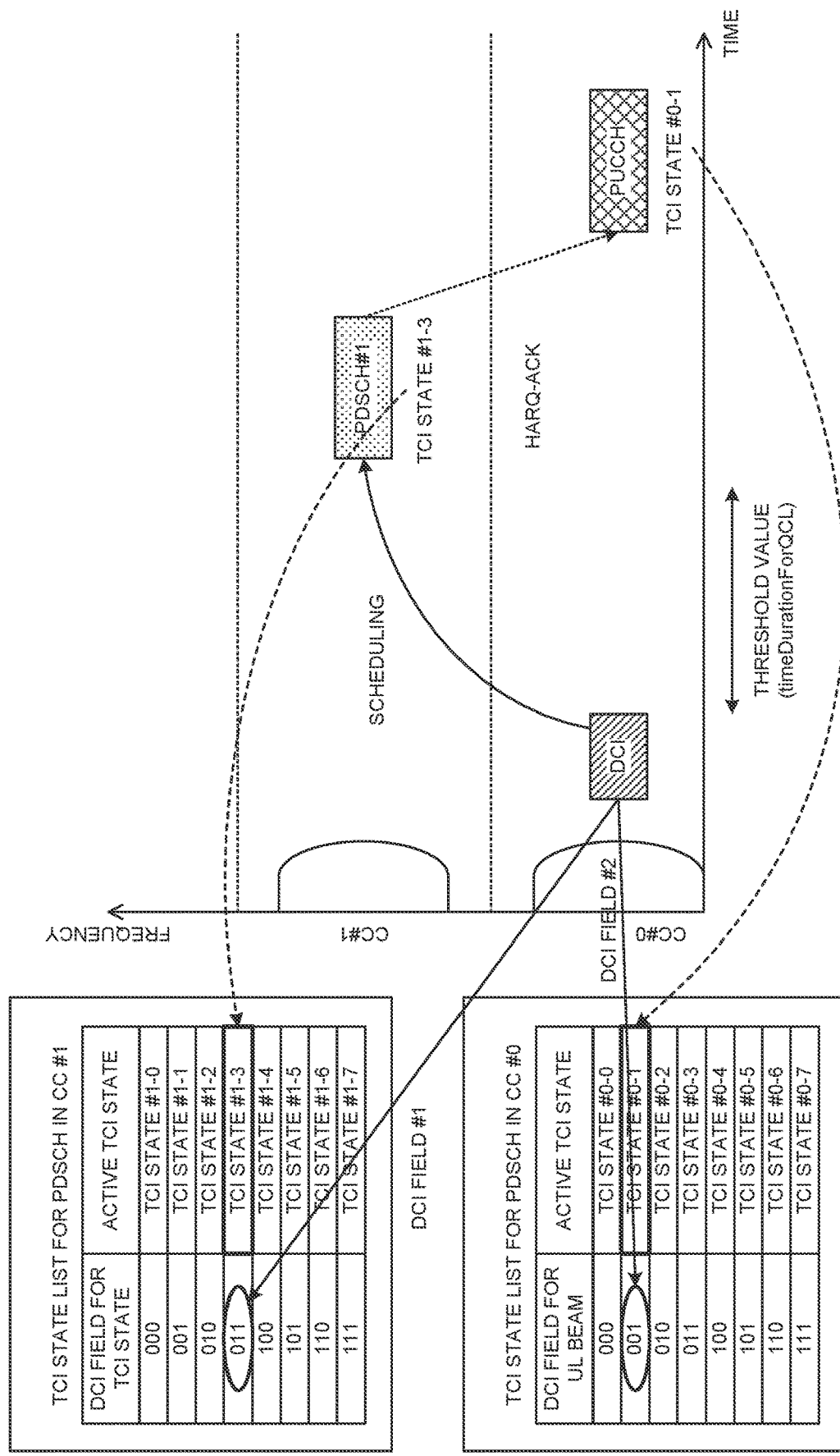
FIG. 7 is a diagram to show another example of the method for determining the spatial relation/TCI state for the UL channel in the case where cross-carrier scheduling is applied.

The UE may receive information related to the TCI state list for the PDSCH configured for each CC by using RRC signaling/MAC CE. FIG. 7 shows a case where a TCI state list for a PDSCH corresponding to CC #0 and a TCI state list for a PDSCH corresponding to CC #1 are configured, FIG. 7 shows a case where correspondence between a plurality of TCI states for the PDSCH and code points of a second field included in the DCI is configured in the TCI state list corresponding to CC #0. FIG. 7 shows a case where correspondence between a plurality of TCI states for the PDSCH and code points of a first field included in the DCI is configured in the TCI state list corresponding to CC #1.

A TCI state applied to PDSCH #1 transmitted on CC #1 may be notified by the first field included in the DCI, and a spatial relation/TCI state applied to the UL channel transmitted on CC #0 may be notified by the second field. Here, a case is shown in which '011' is notified by the first field and '001' is notified by the second field.

The UE judges each of the TCI state for PDSCH #1 and the spatial relation/TCI state for the UL channel on the basis of bit information (for example, code points) of the first field and the second field. Here, a case is shown in which the UE applies TCI state #1-3 (corresponding to '011' of the TCI state list in CC #1) to PDSCH #1 and applies TCI state #0-1 (corresponding to '001' of the TCI state list in CC #0) to the UL channel.

Each TCI state list configured for each CC is specified with use of the separate field, thereby allowing the spatial relation/TCI state for the UL channel as well to be controlled dynamically and flexibly even when a PDSCH and a corresponding UL channel are transmitted on different CCs.

<Option 2-2>

A spatial relation/TCI state list for the UL channel may be configured for each CC (or CC on which at least the UL channel is transmitted). In this case, a spatial relation/TCI state applied to the UL channel may be determined on the basis of the spatial relation/TCI state list for the UL channel configured for a CC on which at least one of the UL channel and the DCI is scheduled. On the other hand, a TCI state applied to a PDSCH may be determined on the basis of a TCI state list configured for a CC on which the PDSCH is transmitted.

The UE may determine, on the basis of information included in DCI corresponding to the UL channel and a spatial relation/TCI state list for the UL channel corresponding to a CC on which the DCI or UL channel is transmitted, a spatial relation/TCI state applied to the UL channel. For example, the spatial relation/TCI state for the UL channel may be determined on the basis of a certain field included in the DCI.

Figure 8:
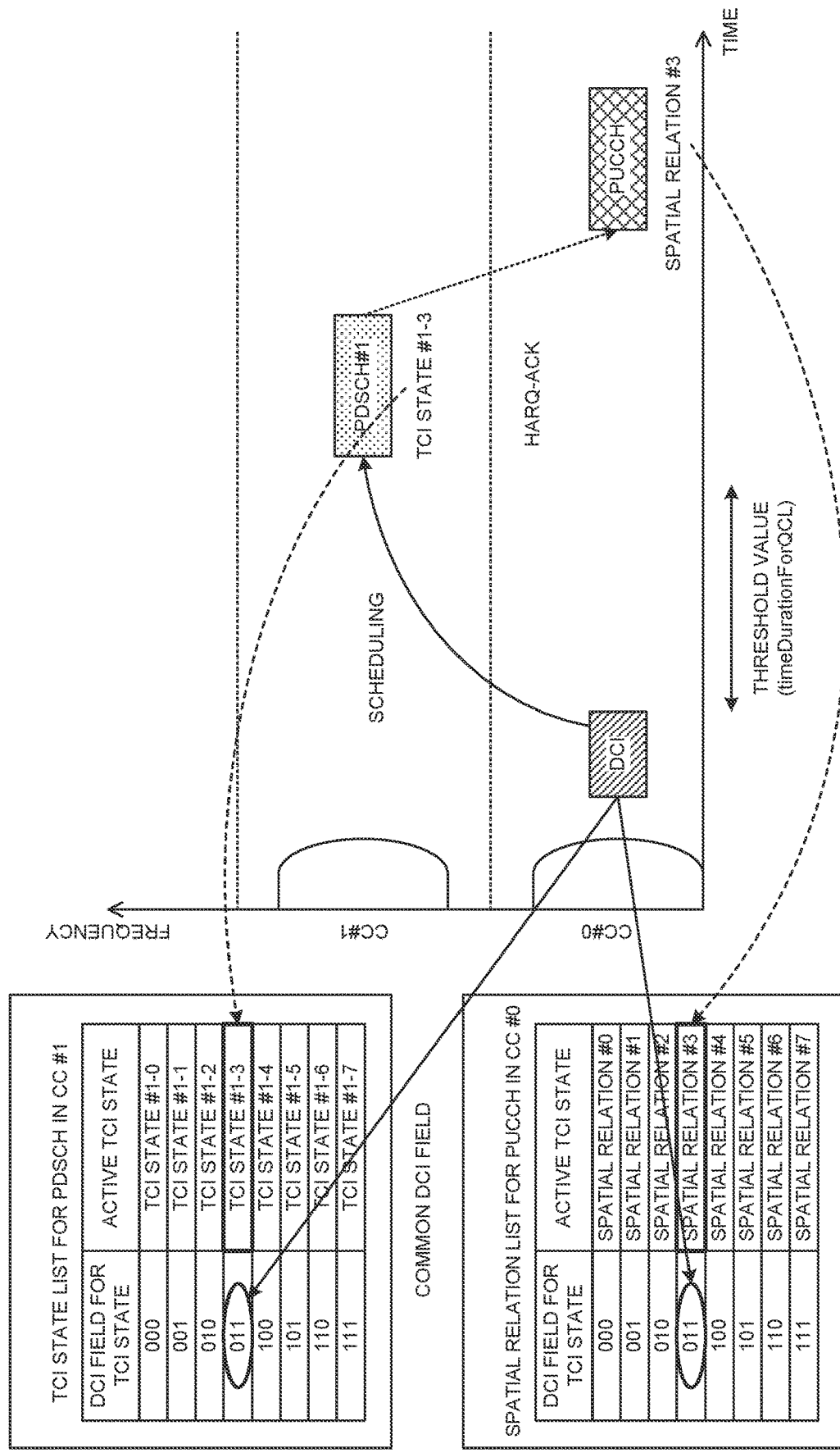
FIG. 8 is a diagram to show another example of the method for determining the spatial relation/TCI state for the UL channel in the case where cross-carrier scheduling is applied.

The certain field used for specification of a spatial relation ID included in the spatial relation/TCI state list for the UL channel may be configured in common with a field (for example, a TCI state field) used for specification of a TCI state ID included in the TCI state list for the PDSCH (see FIG. 8). In other words, a common field may be configured for notification of the spatial relation/TCI state for the UL channel and notification of the TCI state for the PDSCH.

Figure 9:
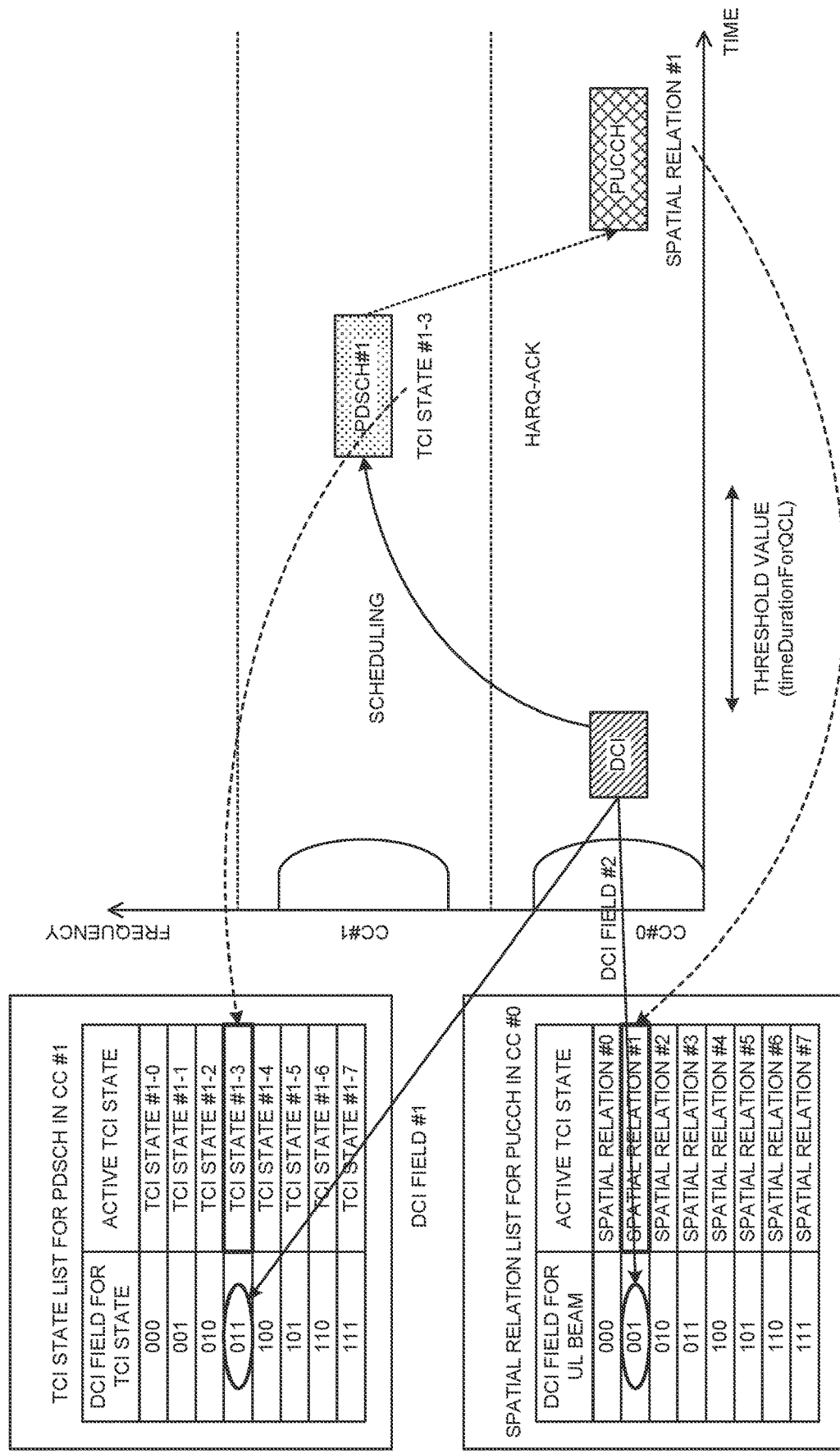
FIG. 9 is a diagram to show another example of the method for determining the spatial relation/TCI state for the UL channel in the case where cross-carrier scheduling is applied.

Alternatively, the certain field used for specification of a spatial relation ID included in the spatial relation/TCI state list for the UL channel may be configured separately from the field (for example, the TCI state field) used for specification of a TCI state ID included in the TCI state list for the PDSCH (see FIG. 9). In other words, a separate field may be configured for performing for notification of the spatial relation/TCI state for the UL channel and notification of the TCI state for the PDSCH.

[Common Field]

The UE may receive information related to the TCI state list for the PDSCH and the spatial relation/TCI state list for the UL channel configured for each CC by using RRC signaling/MAC CE. FIG. 8 shows a case where the spatial relation/TCI state list for a PUCCH corresponding to CC #0 and the TCI state list for a PDSCH corresponding to CC #1 are configured.

FIG. 8 shows a case where correspondence between spatial relations/TCI states for the PUCCH and code points of a TCI state field included in the DCI is configured in the spatial relation/TCI state list for the PUCCH. FIG. 8 shows a case where correspondence between a plurality of TCI states for the PDSCH and code points of a TCI state field included in the DCI is configured in the TCI state list for the PDSCH.

Both the TCI state applied to PDSCH #1 and the spatial relation/TCI state applied to the UL channel may be notified by a common field (for example, a TCI state field) included in the DCI. Here, a case is shown in which '011' is notified by the common field.

The UE judges, on the basis of bit information (for example, code points) of the common field, each of the TCI state applied to the PDSCH transmitted on CC #1 and the spatial relation/TCI state applied to the UL channel transmitted on CC #0. Here, a case is shown in which the UE applies TCI state #1-3 (corresponding to '011' of the TCI state list for the PDSCH in CC #1) to PDSCH #1 and applies spatial relation #3 (corresponding to '011' of the spatial relation/TCI state list for the PUCCH in CC #0) to the UL channel.

Thus, the spatial relation/TCI state list for the UL channel is configured for each CC separately from the TCI state list for the PDSCH, thereby allowing the spatial relation/TCI state for the UL channel as well to be controlled dynamically and flexibly. The TCI state for the PDSCH and the spatial relation/TCI state for the UL channel are notified with use of the common field, thereby allowing an increase in DCI overhead to be suppressed.

{Separate Field}

The UE may receive information related to the TCI state list for the PDSCH and the spatial relation/TCI state list for the UL channel configured for each CC by using RRC signaling/MAC CE. FIG. 9 shows a case where the spatial relation/TCI state list for a PUCCH corresponding to CC #0 and the TCI state list for a PDSCH Corresponding to CC #1 are configured.

FIG. 9 shows a case where correspondence between a plurality pieces of spatial relation (a plurality of spatial relation) for the PUCCH and code points of a second field included in the DCI is configured in the spatial relation/TCI state list for a PUCCH corresponding to each CC (here, CC #0). FIG. 9 shows a case where correspondence between a plurality of TCI states for the PDSCH and code points of a first field included in the DCI is configured in the TCI state list corresponding to each CC (here, CC #1).

A TCI state applied to PDSCH #1 transmitted on CC #1 may be notified by the first field included in the DCI, and a spatial relation/TCI state applied to the UL channel transmitted on CC #0 may be notified by the second field. Here, a case is shown in which '011' is notified by the first field and '001' is notified by the second field.

The UE judges each of the TCI state for PDSCH #1 and the spatial relation/TCI state for the UL channel on the basis of bit information (for example, code points) of the first field and the second field. Here, a case is shown in which the UE applies TCI state #1-3 (corresponding to '011' of the TCI state list for the PDSCH in CC #1) to PDSCH #1 and applies spatial relation #0-1 (corresponding to '001' of the spatial relation/TCI state list for the PUCCH in CC #0) to the UL channel.

Thus, the spatial relation/TCI state list for the UL channel is configured for each CC separately from the TCI state list for the PDSCH, and is specified with use of the separate field, thereby allowing the spatial relation/TCI state for the UL channel as well to be controlled dynamically and flexibly.

Note that the separate field may each be configured in units of CCs, or may be configured for each of the TCI state list for the PDSCH and the spatial relation/TCI state list for the PUCCH/PUSCH.

<Option 2-3>

The spatial relation/TCI state applied to the UL channel may be determined on the basis of a TCI state applied to another signal/channel transmitted on the same CC as a CC on which the UL channel is transmitted. Such another signal/channel may be a PDSCH (see FIG. 10), or may be a DL reference signal (see FIG. 11).

Figure 10:
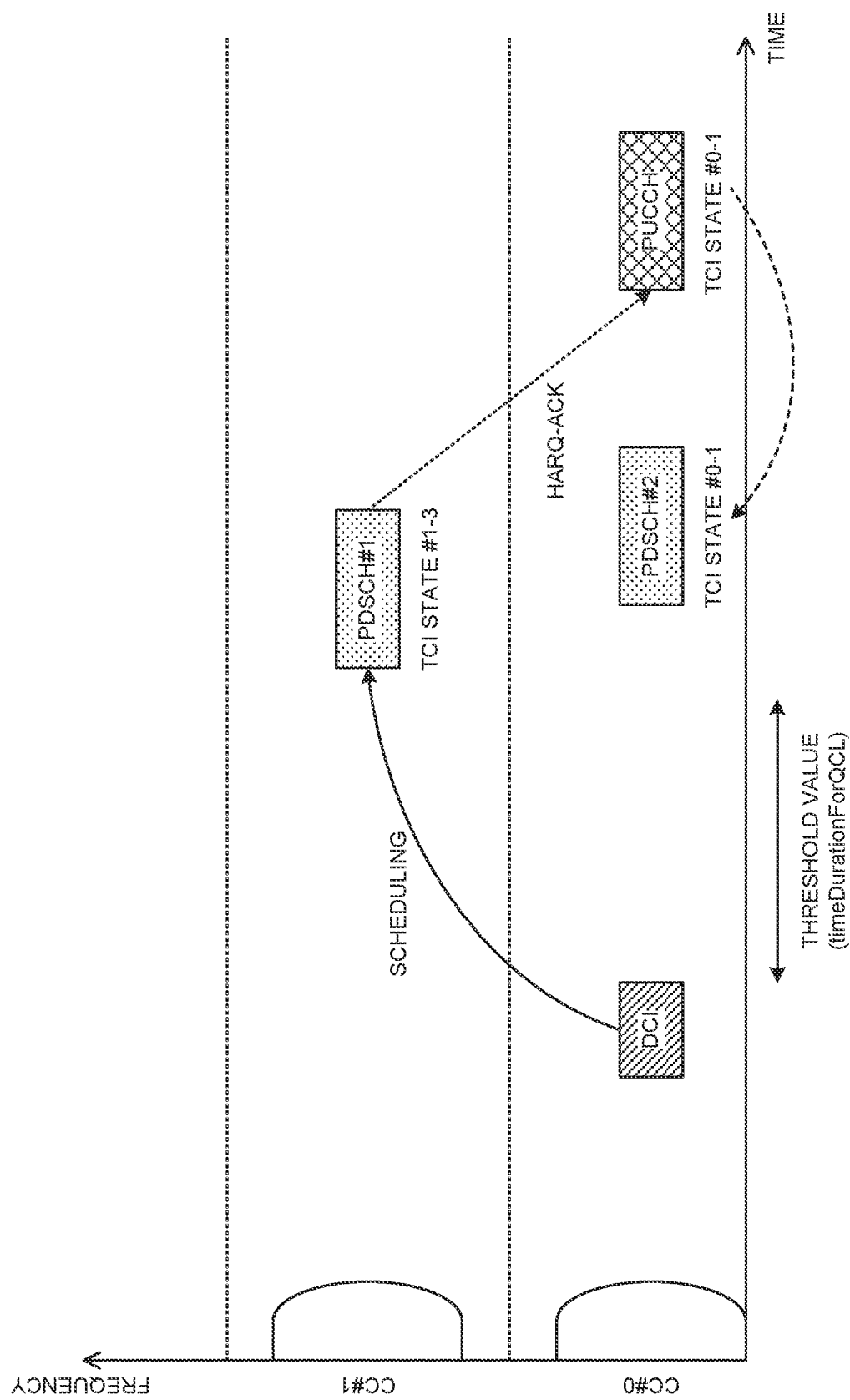
FIG. 10 is a diagram to show another example of the method for determining the spatial relation/ICI state for the UL channel in the case where cross-carrier scheduling is applied.

FIG. 10 shows a case where the spatial relation/TCI state applied to the UL channel is determined on the basis of a TCI state (here, TCI state #0-1) for PDSCH #2 most recently received (most recent reception of PDSCH) in the same CC as the CC (here, CC #0) on which the UL channel is transmitted. Note that the most recent reception may be counted using, as a reference, a timing of transmission of the UL channel, a timing of reception of a scheduled PDSCH (here, PDSCH #1), or a timing of reception of DCI (or PDCCH) to schedule PDSCH #1.

Figure 11:
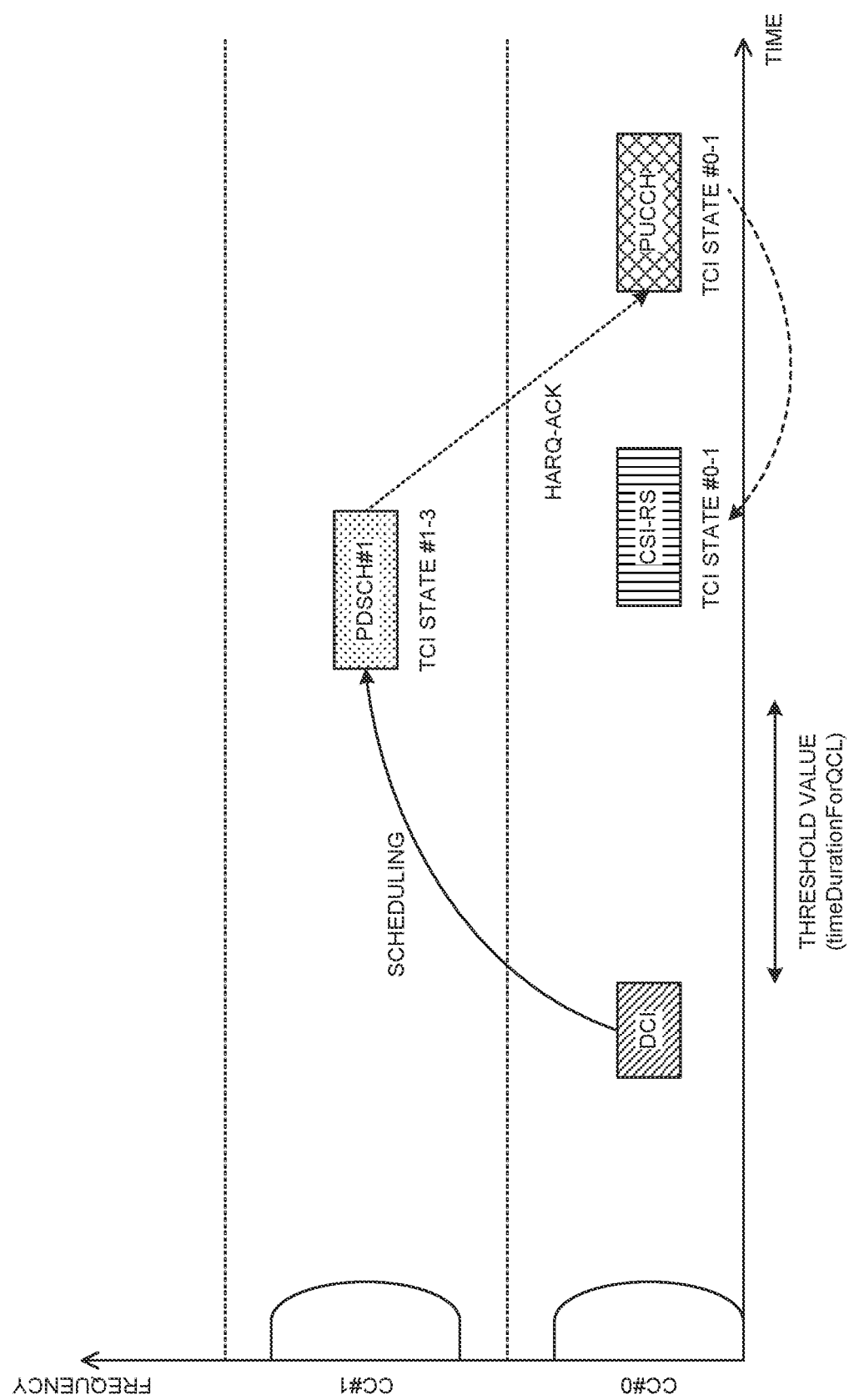
FIG. 11 is a diagram to show another example of the method for determining the spatial relation/TCI state for the UL channel in the case where cross-carrier scheduling is applied.

FIG. 11 shows a case where the spatial relation/TCI state applied to the UL channel is determined on the basis of a TCI state (here, TCI state #0-1) for a DL reference signal (here, a CSI-RS) most recently received in the same CC as the CC (here, CC #0) on which the UL channel is transmitted. Note that the most recent reception may be counted using, as a reference, a timing of transmission of the UL channel, a timing of reception of a scheduled PDSCH (here, PDSCH #1), or a timing of reception of DCI (or PDCCH) to schedule PDSCH #1. The DL reference signal may be limited to a reference signal (for example, an aperiodic CSI-RS) for which a corresponding beam (or TCI state) is notified by the DCI.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 12:
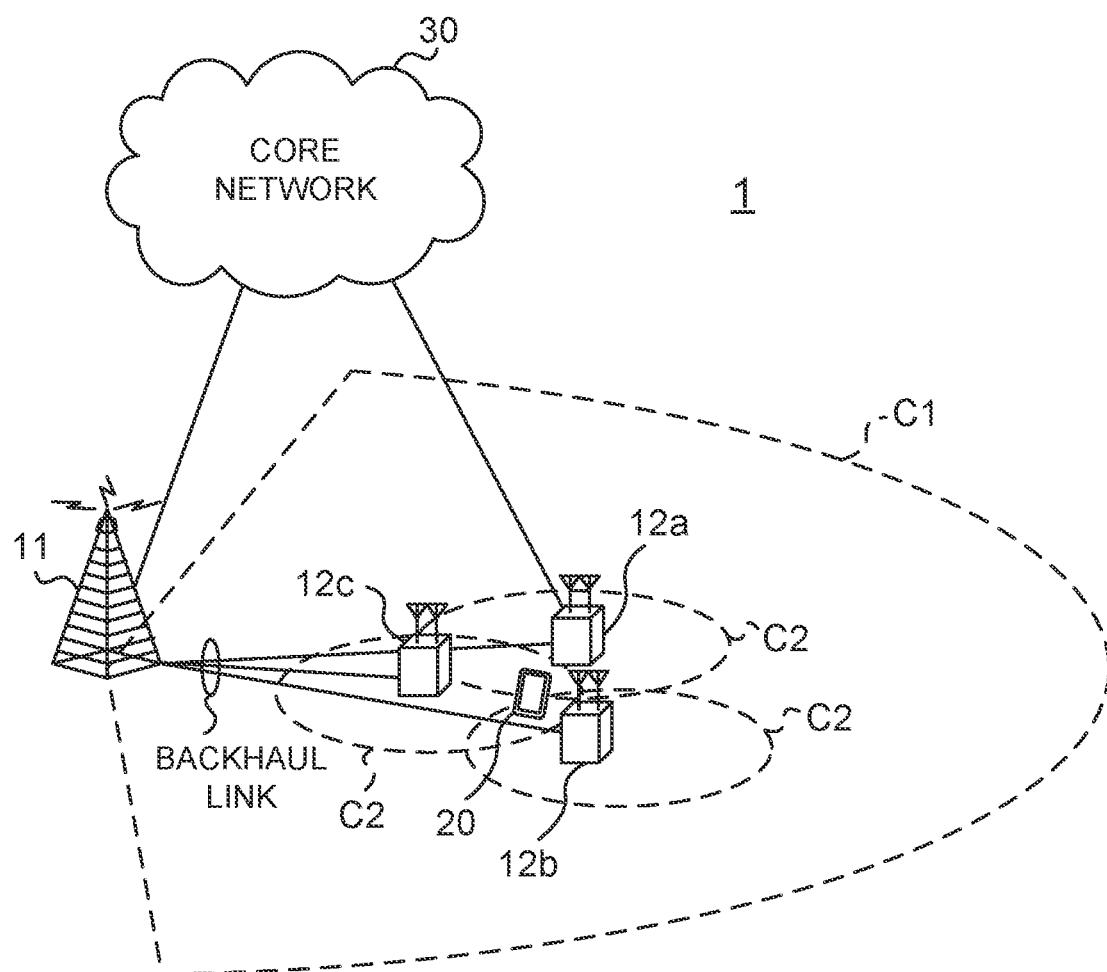
FIG. 12 is a diagram to show an example of a schematic structure of a radio communication system according to one embodiment.

FIG. 12 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHZ (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-S-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 13:
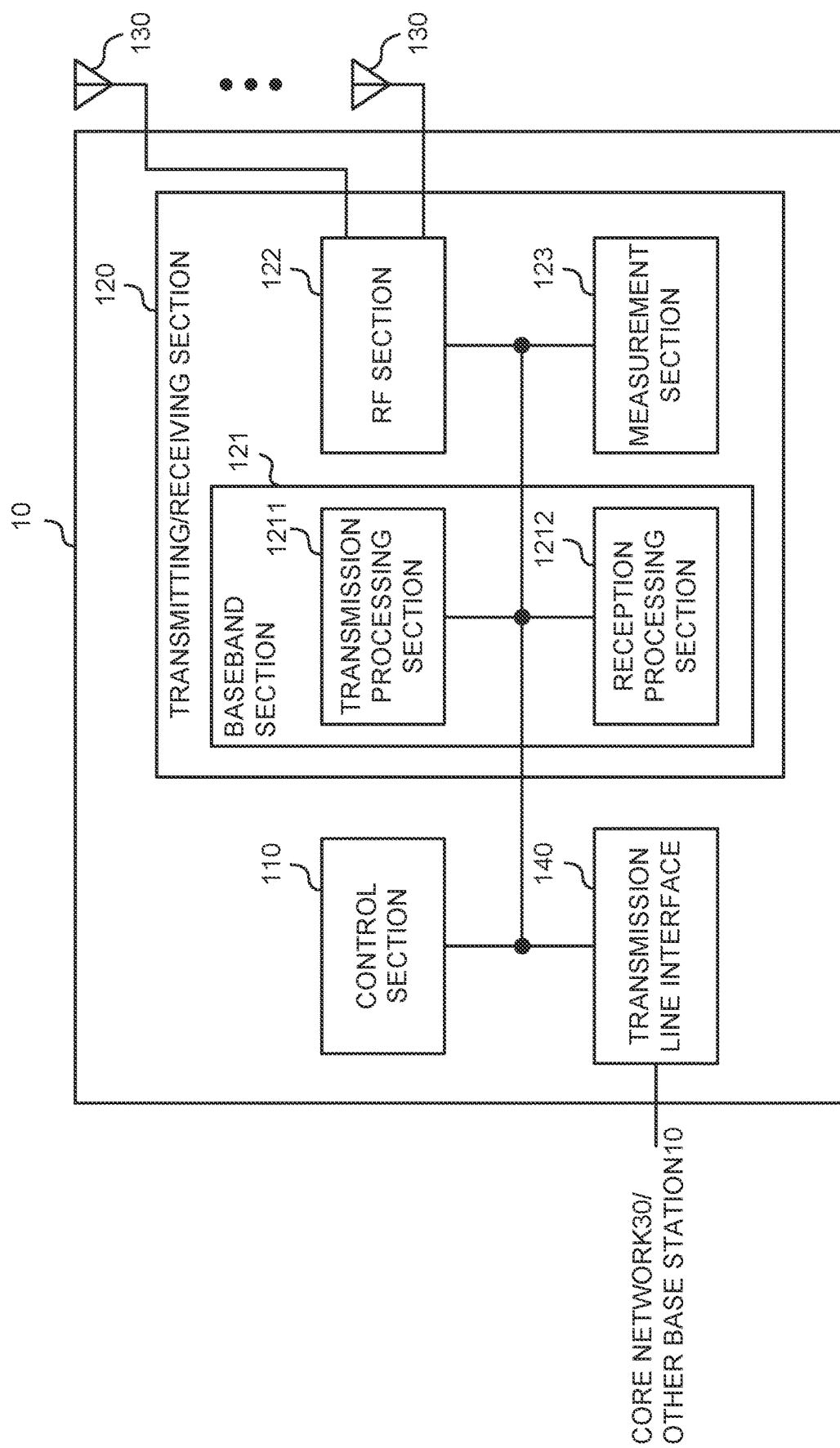
FIG. 13 is a diagram to show an example of a structure of a base station according to one embodiment.

FIG. 13 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit a downlink shared channel scheduled by downlink control information. The transmitting/receiving section 120 may receive, on the basis of at least one of a TCI state applied to the downlink shared channel and information notified by the downlink control information, an uplink channel for which a spatial relation or TCI state is determined.

The transmitting/receiving section 120 may transmit downlink control information and a downlink shared channel scheduled by the downlink control information on a cell different from that for the downlink control information. The transmitting/receiving section 120 may receive, on the basis of at least one of a TCI state list or spatial relation list configured for each cell and information notified by the downlink control information, an uplink channel for which a spatial relation or TCI state is determined.

(User Terminal)

Figure 14:
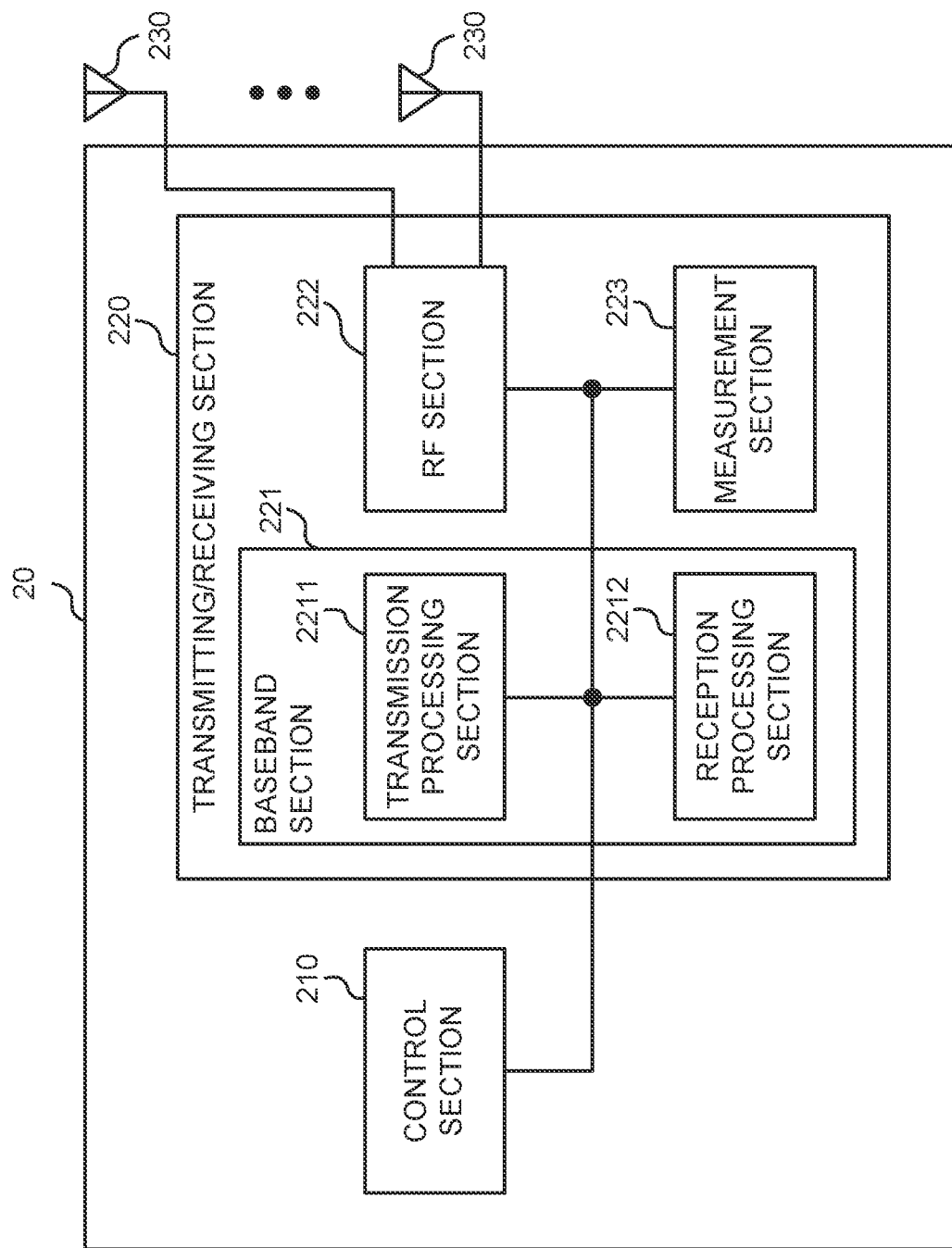
FIG. 14 is a diagram to show an example of a structure of a user terminal according to one embodiment.

FIG. 14 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-S-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive a downlink shared channel scheduled by downlink control information. Alternatively, the transmitting/receiving section 220 may receive downlink control information and a downlink shared channel scheduled by the downlink control information on a cell different from that for the downlink control information.

The control section 210 may determine, on the basis of at least one of a TCI state applied to the downlink shared channel and information notified by the downlink control information, a spatial relation or TCI state applied to an uplink channel corresponding to the downlink control information.

For example, the control section 210 may judge, on the basis of a common bit field included in the downlink control information, the TCI state applied to the downlink shared channel and the spatial relation or TCI state applied to the uplink channel. Alternatively, the control section 210 may judge, on the basis of a first bit field included in the downlink control information, the TCI state applied to the downlink shared channel, and may judge, on the basis of a second bit field included in the downlink control information, the spatial relation or TCI state applied to the uplink channel.

The control section 210 may determine, on the basis of at least one of a TCI state list or spatial relation list configured for each cell and information notified by the downlink control information, a spatial relation or TCI state applied to an uplink channel corresponding to the downlink control information.

For example, the control section 210 may judge, on the basis of a common bit field included in the downlink control information, the TCI state applied to the downlink shared channel and the spatial relation or TCI state applied to the uplink channel. Alternatively, the control section 210 may judge, on the basis of a first bit field included in the downlink control information, the TCI state applied to the downlink shared channel, and may judge, on the basis of a second bit field included in the downlink control information, the spatial relation or TCI state applied to the uplink channel. Alternatively, when a spatial relation or TCI state corresponding to the uplink channel is not notified by the downlink control information, the control section 210 may apply, to the uplink channel, a spatial relation or TCI state corresponding to a downlink shared channel or reference signal transmitted on a cell on which the uplink channel is transmitted.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (two or more physically or logically separate apparatus), for example, via wire, wireless, or the like, and using these plurality of pieces of apparatus (these plurality of apparatus). The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 15:
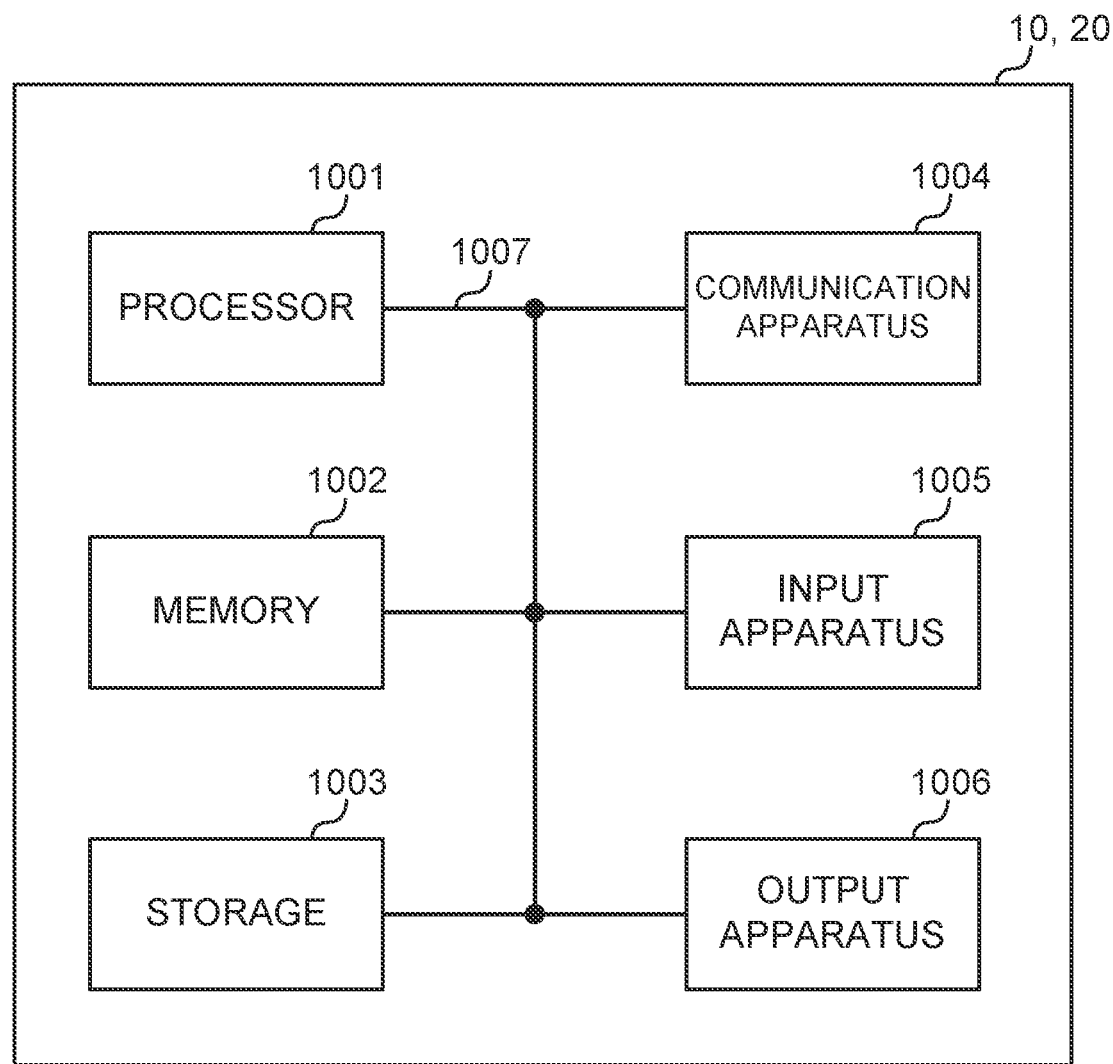
FIG. 15 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 15 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus (between apparatus).

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware (these hardware).

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIS.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields of particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these. Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state);" a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)); IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a receiver that receives downlink control information including a field used to indicate a transmission configuration indication (TCI) state; and
a processor that, in response to a parameter, which indicates a plurality of downlink (DL) TCI states or a plurality of uplink (UL) TCI states, being configured via higher layer signaling and a spatial relation not being configured per sounding reference signal (SRS) resource, determines, based on a same codepoint of the field, a DL TCI state for a DL channel and an UL TCI state for the SRS resource,
wherein the plurality of DL TCI states and the plurality of UL TCI states are indicated by the parameter via the higher layer signaling, and the terminal supports an index of the DL TCI state for the DL channel and an index of the UL TCI state for the SRS resource being configured differently for the codepoint.

2. A radio communication method for a terminal, comprising:
receiving downlink control information including a field used to indicate a transmission configuration indication (TCI) state; and
in response to a parameter, which indicates a plurality of downlink (DL) TCI states or a plurality of uplink (UL) TCI states, being configured via higher layer signaling and a spatial relation not being configured per sounding reference signal (SRS) resource, determining, based on a same codepoint of the field, a DL TCI state for a DL channel and an UL TCI state for the SRS resource,
wherein the plurality of DL TCI states and the plurality of UL TCI states are indicated by the parameter via the higher layer signaling, and the terminal supports an index of the DL TCI state for the DL channel and an index of the UL TCI state for the SRS resource being configured differently for the codepoint.

3. A base station comprising:
a transmitter that transmits downlink control information including a field used to indicate a transmission configuration indication (TCI) state; and
a processor that, in response to a parameter, which indicates a plurality of downlink (DL) TCI states or a plurality of uplink (UL) TCI states, being configured via higher layer signaling and a spatial relation not being configured per sounding reference signal (SRS) resource, indicates, based on a same codepoint of the field, a DL TCI state for a DL channel and an UL TCI state for the SRS resource,
wherein the plurality of DL TCI states and the plurality of UL TCI states are indicated by the parameter via the higher layer signaling, and the base station supports an index of the DL TCI state for the DL channel and an index of the UL TCI state for the SRS resource being configured differently for the codepoint.

4. A system comprising a terminal and a base station, wherein
the terminal comprises:
a receiver that receives downlink control information including a field used to indicate a transmission configuration indication (TCI) state; and
a processor that, in response to a parameter, which indicates a plurality of downlink (DL) TCI states or a plurality of uplink (UL) TCI states, being configured via higher layer signaling and a spatial relation not being configured per sounding reference signal (SRS) resource, determines, based on a same codepoint of the field, a DL TCI state for a DL channel and an UL TCI state for the SRS resource,
wherein the plurality of DL TCI states and the plurality of UL TCI states are indicated by the parameter via the higher layer signaling, and the terminal supports an index of the DL TCI state for the DL channel and an index of the UL TCI state for the SRS resource being configured differently for the codepoint, and
the base station comprises:
a transmitter that transmits the downlink control information; and
a processor that indicates, based on the same codepoint of the field, the DL TCI state for the DL channel and the UL TCI state for the SRS resource.

* * * * *